US012592109B2

(12) United States Patent　　　　(10) Patent No.:　US 12,592,109 B2
　　　Casper et al.　　　　　　　　　　(45) Date of Patent:　　Mar. 31, 2026

(54) BUILDING EQUIPMENT ACCESS MANAGEMENT SYSTEM WITH DYNAMIC ACCESS CODE GENERATION TO UNLOCK EQUIPMENT CONTROL PANELS

(71) Applicant: Tyco Fire & Security GMBH, Neuhausen am Rheinfall (CH)

(72) Inventors: Ian M. Casper, York, PA (US); Daniela M. Natali, New Carrollton, MD (US); Kaitlin Logan, York, PA (US); Curtis C. Crane, York, PA (US); Leland J. Szewerenko, Austin, TX (US); Joseph J. Villani, Jr., Seven Valleys, PA (US); Christine E. Kinner, Horseheads, NY (US); Joseph F. Capezzuto, Ligonier, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 21 days.

(21) Appl. No.: 18/883,990

(22) Filed: Sep. 12, 2024

(65) Prior Publication Data

US 2025/0005980 A1　　Jan. 2, 2025

Related U.S. Application Data

(63) Continuation of application No. PCT/US2023/016879, filed on Mar. 30, 2023.
(Continued)

(51) Int. Cl.
　H04L 29/06　　　(2006.01)
　G07C 9/00　　　(2020.01)
　　　(Continued)

(52) U.S. Cl.
　CPC ..... G07C 9/00309 (2013.01); G07C 9/00857 (2013.01); G07C 9/21 (2020.01);
　　　(Continued)

(58) Field of Classification Search
　None
　See application file for complete search history.

(56) References Cited

U.S. PATENT DOCUMENTS

2005/0090915 A1* 4/2005 Geiwitz ................. G05B 15/02
　　　　　　　　　　　　　　　　　　　700/275
2017/0093860 A1* 3/2017 Hafernik ............... H04L 63/107
　　　　　　　　　(Continued)

FOREIGN PATENT DOCUMENTS

CN　　　113992719 A　　1/2022
DE　10 2013 101 985 A1　10/2013
　　　　(Continued)

OTHER PUBLICATIONS

International Preliminary Report on Patentability on PCT Appl. No. PCT/US2023/016879 dated Oct. 10, 2024 (8 pages).
(Continued)

*Primary Examiner* — Shin-Hon (Eric) Chen
(74) *Attorney, Agent, or Firm* — Foley & Lardner LLP

(57)　　　ABSTRACT

A system for controlling access to building equipment, the system having one or more memory devices having instructions stored thereon that, when executed cause one or more processors to perform operations. The operations include receiving an access request from a user device to access a device of building equipment, the access request indicating the device to which access is requested and an identity of an entity requesting access. The operations also include selecting an access level of the entity from a plurality of access levels stored in an access profile database based on the access request. The operations further include generating an
(Continued)

encrypted access code indicating the access level of the entity, and transmitting the encrypted access code to the user device, the encrypted access code granting access to the device when the encrypted access code is entered via a device interface of the device.

20 Claims, 19 Drawing Sheets

Related U.S. Application Data

(60) Provisional application No. 63/326,031, filed on Mar. 31, 2022.

(51) Int. Cl.
| | | |
|---|---|---|
| *G07C 9/21* | (2020.01) | |
| *H04L 9/32* | (2006.01) | |

(52) U.S. Cl.
CPC .. *H04L 9/3228* (2013.01); *G07C 2009/00412* (2013.01); *G07C 2209/04* (2013.01); *G07C 2209/08* (2013.01)

(56) References Cited

U.S. PATENT DOCUMENTS

| | | | | |
|---|---|---|---|---|
| 2018/0123804 | A1* | 5/2018 | Smith | H04L 63/0869 |
| 2018/0146369 | A1* | 5/2018 | Kennedy, Jr. | H04W 12/04 |
| 2018/0206096 | A1* | 7/2018 | Sharma | H04L 67/55 |
| 2019/0095835 | A1* | 3/2019 | Jarvis | G06Q 10/06 |
| 2019/0276275 | A1* | 9/2019 | Yang | B66B 1/468 |
| 2020/0043262 | A1* | 2/2020 | Schlacks, IV | G06Q 20/203 |
| 2020/0401091 | A1* | 12/2020 | Leonardi | G06F 21/6218 |
| 2021/0176059 | A1* | 6/2021 | Hertrich | H04L 9/3271 |
| 2021/0407229 | A1 | 12/2021 | Schoenfelder et al. | |
| 2022/0051514 | A1* | 2/2022 | Schmidt | G06V 20/00 |
| 2022/0051515 | A1* | 2/2022 | Schmidt | G06Q 10/02 |
| 2022/0309849 | A1* | 9/2022 | Ellerman | H04W 12/062 |

FOREIGN PATENT DOCUMENTS

| | | |
|---|---|---|
| TW | 201531081 A | 8/2015 |
| TW | 201946418 A | 12/2019 |
| WO | WO-2018/213692 A1 | 11/2018 |

OTHER PUBLICATIONS

International Search Report and Written Opinion on PCT Appl. No. PCT/US2023/016879 dated Jul. 3, 2023 (13 pages).
Taiwanese Office Action on TW Appl. No. 112112711 dated Mar. 5, 2024 (35 pages with English language translation).
Office Action and Search Report on Taiwan Appl. No. TW 112112711 dated Nov. 21, 2024 (14 pages).

* cited by examiner

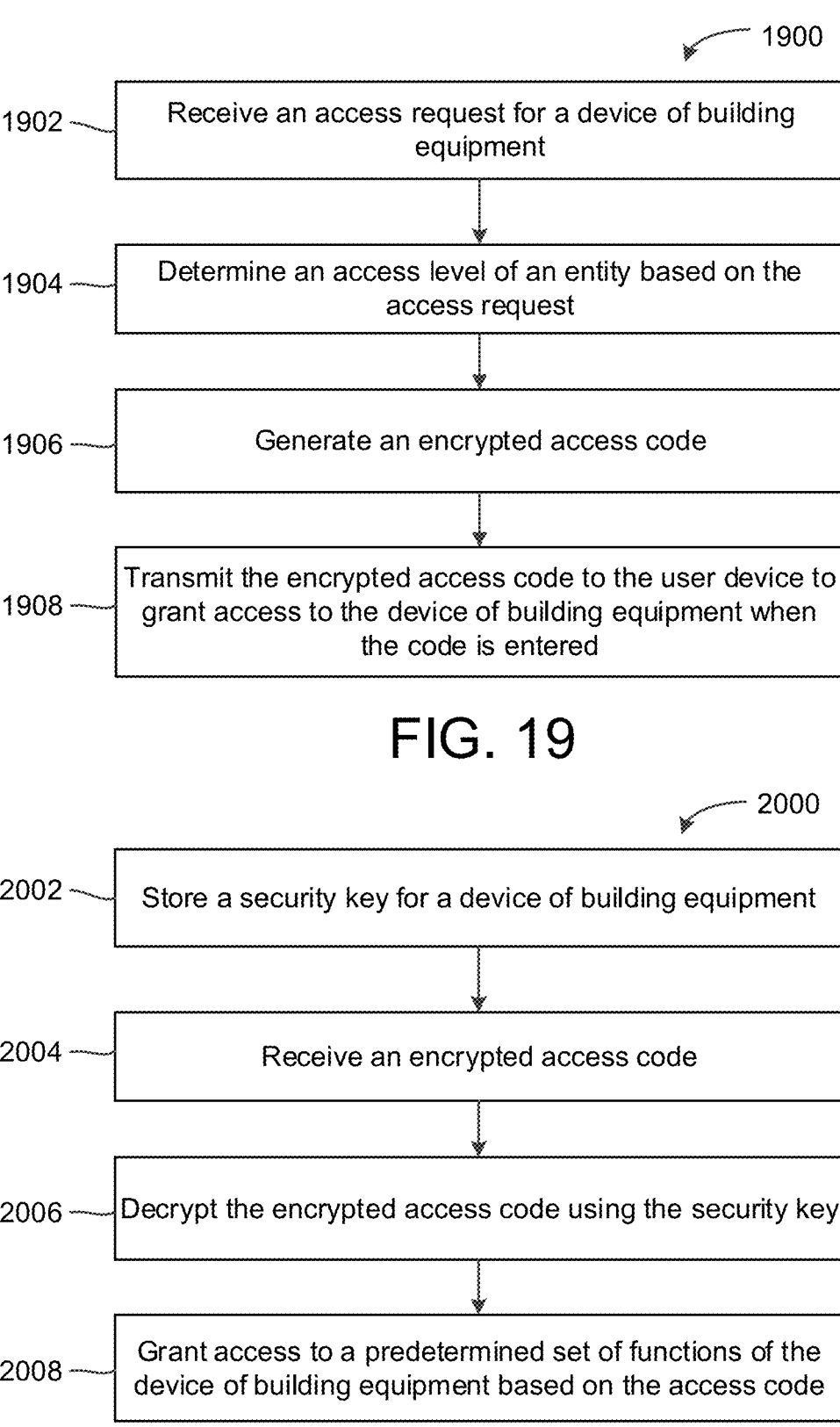

1900

1902 — Receive an access request for a device of building equipment

1904 — Determine an access level of an entity based on the access request

1906 — Generate an encrypted access code

1908 — Transmit the encrypted access code to the user device to grant access to the device of building equipment when the code is entered

2002 — Store a security key for a device of building equipment

2004 — Receive an encrypted access code

2006 — Decrypt the encrypted access code using the security key

2008 — Grant access to a predetermined set of functions of the device of building equipment based on the access code

FIG. 20

BUILDING EQUIPMENT ACCESS MANAGEMENT SYSTEM WITH DYNAMIC ACCESS CODE GENERATION TO UNLOCK EQUIPMENT CONTROL PANELS

CROSS-REFERENCE TO RELATED PATENT APPLICATIONS

This application is a continuation of P.C.T. Patent Application No. PCT/US2023/016879 filed Mar. 30, 2023, which claims the benefit of and priority to U.S. Provisional Patent Application No. 63/326,031 filed Mar. 31, 2022, each of which is incorporated by reference herein in its entirety.

BACKGROUND

The present disclosure relates generally to an access management system for building equipment such as chillers, boilers, air handling units, and other types of building equipment, and more particularly to an access management system configured to allow access to a set of functions of a device of building equipment using a control panel located on or in the local environment of the building equipment.

A chiller is an apparatus that is used to generate temperature controlled water, most often cooled water, which can be used to cool air, products, machines, etc. Traditional chillers include control panels that use static access codes to grant access to functions of the chiller. Many times, these static access codes are not changed for several years, meaning the access codes become publically available and users have unrestricted access to control functions of the chiller. Thus, it has become increasingly difficult to control and monitor appropriate and authorized access to functions of chillers. It would be beneficial to have a system and/or methods that provide secure and appropriate access to chillers.

SUMMARY

One implementation of the present disclosure is a system for controlling access to building equipment. The system includes one or more memory devices having instructions stored thereon that, when executed by one or more processors, cause the one or more processors to perform operations. The operations include receiving an access request from a user device to access a device of building equipment, the access request indicating the device of building equipment to which access is requested and an identity of an entity requesting the access. The operations further include selecting an access level of the entity from a plurality of access levels stored in an access profile database based on the identity of the entity requesting the access and the device of building equipment to which the access is requested. The operations also include generating an encrypted access code indicating the access level of the entity, and transmitting the encrypted access code to the user device in response to the access request, the encrypted access code granting access to the device of building equipment when the encrypted access code is entered via a device interface of the device of building equipment.

In some embodiments, the operations further include determining a time period during which the encrypted access code will permit access to the device of building equipment, and encoding an indication of the time period into the encrypted access code, wherein the encrypted access code no longer permits access to the device of building equipment after the time period has expired.

In some embodiments, the operations further include determining a time period during which the encrypted access code will permit access to the device of building equipment, and encoding an indication of the time period into the encrypted access code, wherein the encrypted access code permits access to the device of building equipment after the time period.

In some embodiments, the plurality of access levels correspond to a plurality of different predetermined sets of functions of the device of building equipment to which access can be granted. Further, the encrypted access code permits the entity to access a predetermined set of functions of the device of building equipment corresponding to the access level when the encrypted access code is entered via the device interface of the device of building equipment.

In some embodiments, the plurality of access levels stored in the access profile database are provided by an owner of the device of building equipment.

In some embodiments, the encrypted access code is an alphanumeric code configured to be decrypted using a security key stored within the device of building equipment.

In some embodiments, the encrypted access code is provided as an input to the device of building equipment via the device interface without requiring the device of building equipment to be connected to a communications network.

Another implementation of the present disclosure is a device of building equipment. The device of building equipment includes a device interface configured to receive an encrypted access code indicating an access level of an entity requesting access to the device of building equipment. The device of building equipment also includes one or more memory devices storing a security key for the device of building equipment and instructions that, when executed by one or more processors, cause the one or more processors to perform operations. The operations comprise decrypting the encrypted access code using the security key to determine the access level of the entity to the device of building equipment indicated by the encrypted access code. The operations further include granting access to a predetermined set of functions of the device of building equipment corresponding to the access level by making the predetermined set of functions accessible to the entity via the device interface.

In some embodiments, the operations further include generating a device identity code identifying the device of building equipment, and presenting the device identity code via the device interface, wherein the encrypted access code is generated based on the device identity code.

In some embodiments, the device identity code is presented on the device interface as a QR code.

In some embodiments, the one or more memory devices storing a plurality of access levels corresponding to a plurality of different predetermined sets of functions of the device of building equipment to which access can be granted. The operations further include selecting the access level from the plurality of different predetermined sets of functions based on the encrypted access code.

In some embodiments, the operations include determining, based on information encoded into the encrypted access code, a time period during which the encrypted access code will permit access to the device of building equipment. The operations also include revoking the access to the device of building equipment permitted by the encrypted access code after the time period has expired.

In some embodiments, the operations further comprising denying access to the device of building equipment and providing an indication the entity does not have access to the device of building equipment via the device interface in response to entry of an invalid or expired access code via the device interface or in response to the encrypted access code indicating that the entity does not have access to the device of building equipment.

In some embodiments, the operations further comprising storing the encrypted access code in an access log in a database of the device of building equipment.

Yet another implementation of the present disclosure is a system for controlling access to building equipment. The system includes an access manager platform having one or more memory devices having instructions stored thereon that, when executed by one or more processors, cause the one or more processors to perform operations comprising. The operations include receiving an access request from a user device to access a device of building equipment, the access request indicating the device of building equipment to which access is requested and an identity of an entity requesting the access. The operations further include selecting an access level of the entity from a plurality of access levels stored in an access profile database based on the identity of the entity requesting the access and the device of building equipment to which the access is requested. The operations also include generating an encrypted access code indicating the access level of the entity, and transmitting the encrypted access code to the user device in response to the access request, the encrypted access code granting access to the device of building equipment when the encrypted access code is entered via a device interface of the device of building equipment. The device of building equipment includes one or more memory devices storing the security key for the device of building equipment and instructions that, when executed by one or more processors, cause the one or more processors to perform operation. The operations include decrypting the encrypted access code using the security key to determine the access level of the entity to the device of building equipment indicated by the encrypted access code. The operations further include granting access to a predetermined set of functions of the device of building equipment corresponding to the access level by making the predetermined set of functions accessible to the entity via the device interface.

In some embodiments, the operations of the access manager platform further include determining a time period during which the encrypted access code will permit access to the device of building equipment, and encoding an indication of the time period into the encrypted access code, wherein the encrypted access code no longer permits access to the device of building equipment after the time period has expired.

In some embodiments, the operations of the access manager platform further include determining a time period during which the encrypted access code will permit access to the device of building equipment, and encoding an indication of the time period into the encrypted access code, wherein the encrypted access code permits access to the device of building equipment after the time period.

In some embodiments, the plurality of access levels correspond to a plurality of different predetermined sets of functions of the device of building equipment to which access can be granted. Further, the encrypted access code permits the entity to access a predetermined set of functions of the device of building equipment corresponding to the access level when the encrypted access code is entered via the device interface of the device of building equipment.

In some embodiments, the plurality of access levels stored in the access profile database are provided by an owner of the device of building equipment.

In some embodiments, the encrypted access code is an alphanumeric code configured to be decrypted using the security key stored within the device of building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 19 is a flow diagram of a process for providing access to the device of FIG. 8 using an encrypted access code, according to some embodiments.

FIG. 20 is a flow diagram of a process for allowing access to a set of functions of the device of FIG. 8 based on an encrypted access code, according to some embodiments.

DETAILED DESCRIPTION

Overview

Figure 1:
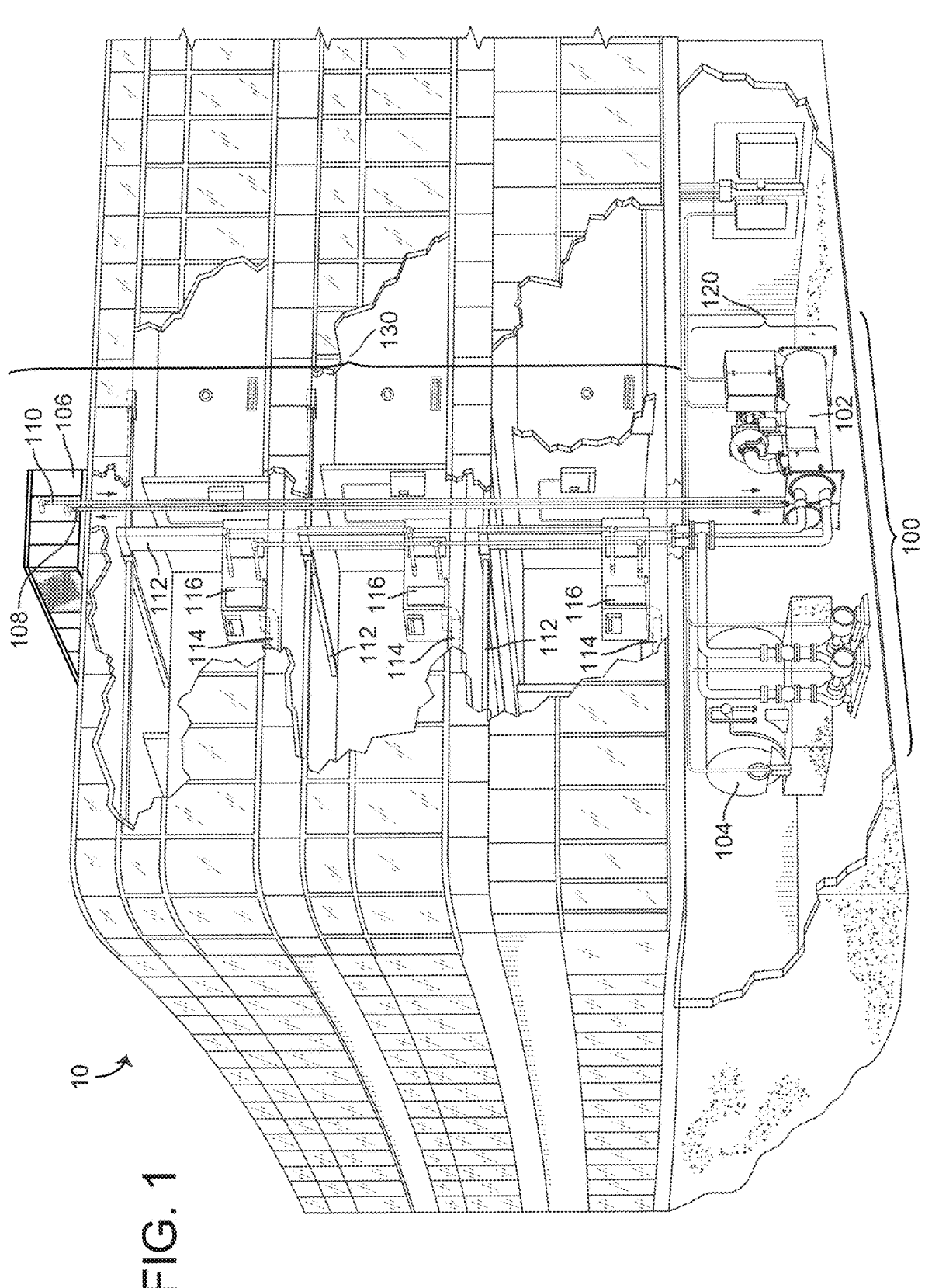
FIG. 1 is a drawing of a building equipped with a building management system (BMS) and a HVAC system, according to some embodiments.

Referring generally to the FIGURES, systems and methods for managing access to a device of building equipment using an encrypted access code are shown, according to various embodiments. An exemplary access management system may include an access manager platform, a device of building equipment, and a user device. The access manager platform may be a component of an access management system that receives an access request from an entity to access the device of building equipment. The access manager platform may determine an access level of the entity based on the access request. The access manager platform may further generate an encrypted access code indicating the access level of the entity, and transmit the access code to the user device to allow access to a set of functions of the device of building equipment.

In some cases, the access manager platform is configured to receive an access request from a user of the user device. The access request may include device data indicating the device of building equipment to which access is requested, and entity data indicating the entity (e.g., user) requesting access. In some embodiments, the access request includes additional access request parameters (e.g., access start time, access level, access duration, etc.). The access manager platform may determine the access level of the entity, for example by comparing the device and entity identified in the access request to a plurality of access profiles stored in an access profile database. Based on the comparison, the access manager platform may determine an access level of entity to the device (e.g., an access profile), and generate an encrypted access code indicating the access level of the entity to the device. The access manager platform may further transmit the encrypted access code to the user device, and the encrypted access code may be entered at the device to grant access to a set of functions of the device of building equipment.

In an exemplary embodiment, the device of building equipment provides device data indicating an identity of the device. In an exemplary embodiment, the device of building equipment is configured to provide device data indicating the identity of the device via a device interface, for example in the form of a QR code. Prior to the access request, the device of building equipment may receive and store a security key, which may be used to decrypt an encrypted access code. In an exemplary embodiment, the security key is received and stored upon manufacturing and commissioning; however, in other embodiments the security key is received and stored upon replacement and/or installation of a memory device and a software update or upgrade to the device, installation of a new memory device, and/or any other suitable process configured to establish an encryption system in the device of building equipment. According to an exemplary embodiment, the device of building equipment receives an encrypted access code (e.g., via a user of a user device), and decrypts the encrypted access code so as to allow a user access to a predetermined set of functions of the device.

Building HVAC Systems and Building Management Systems

Figure 2:
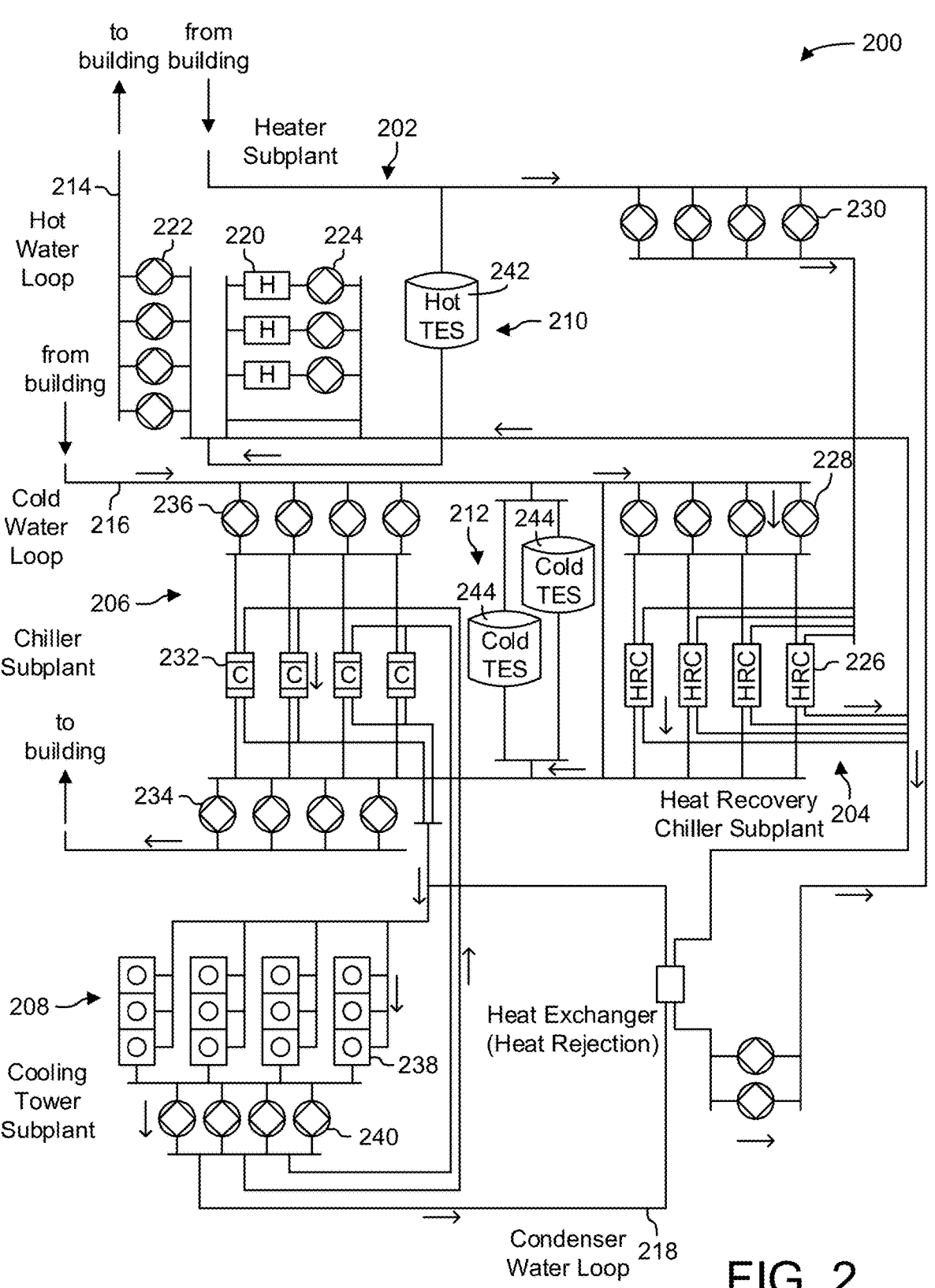
FIG. 2 is a schematic of a waterside system which can be used as part of the HVAC system of FIG. 1, according to some embodiments.
Figure 3:
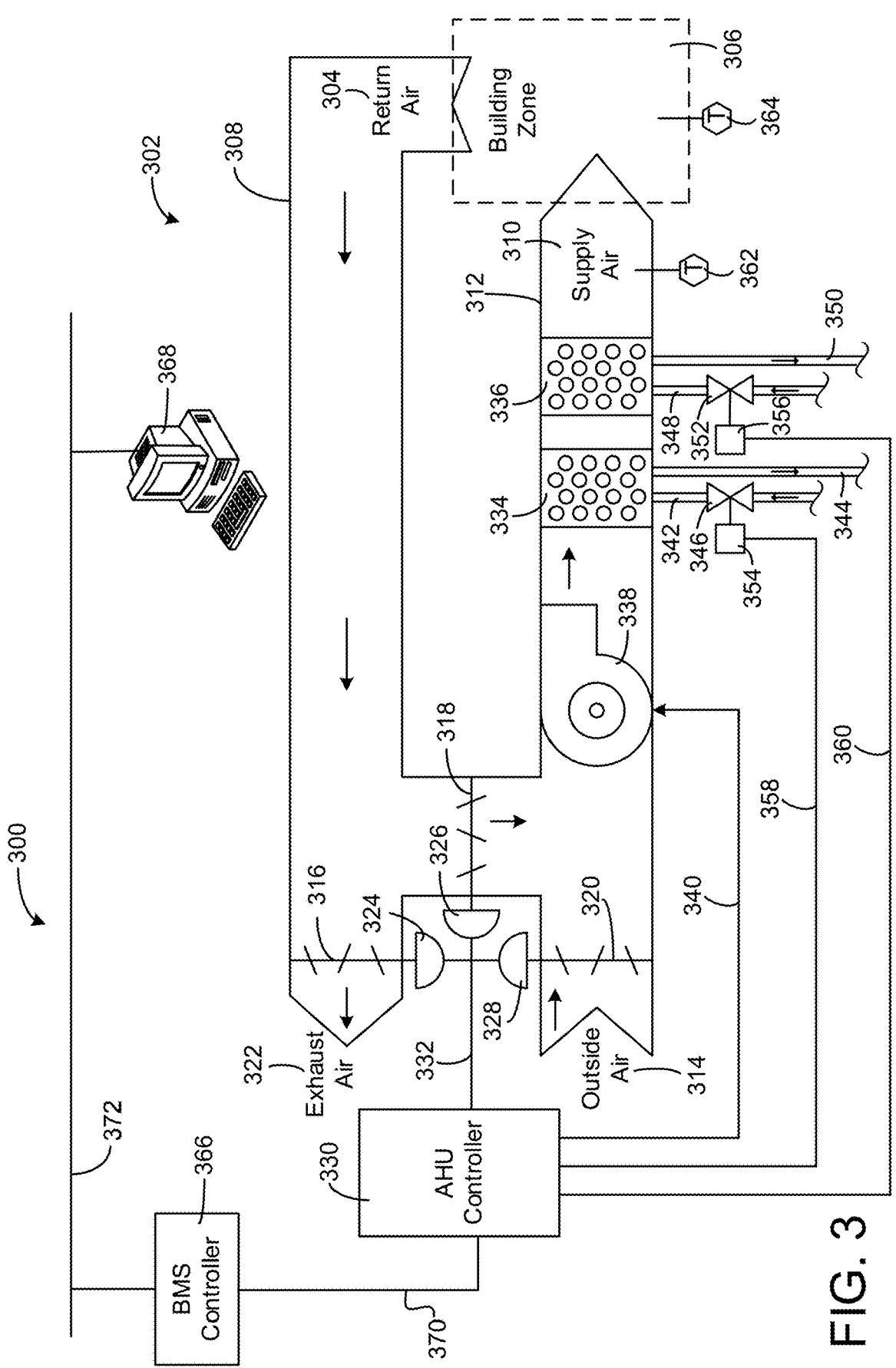
FIG. 3 is a block diagram of an airside system which can be used as part of the HVAC system of FIG. 1, according to some embodiments.
Figure 4:
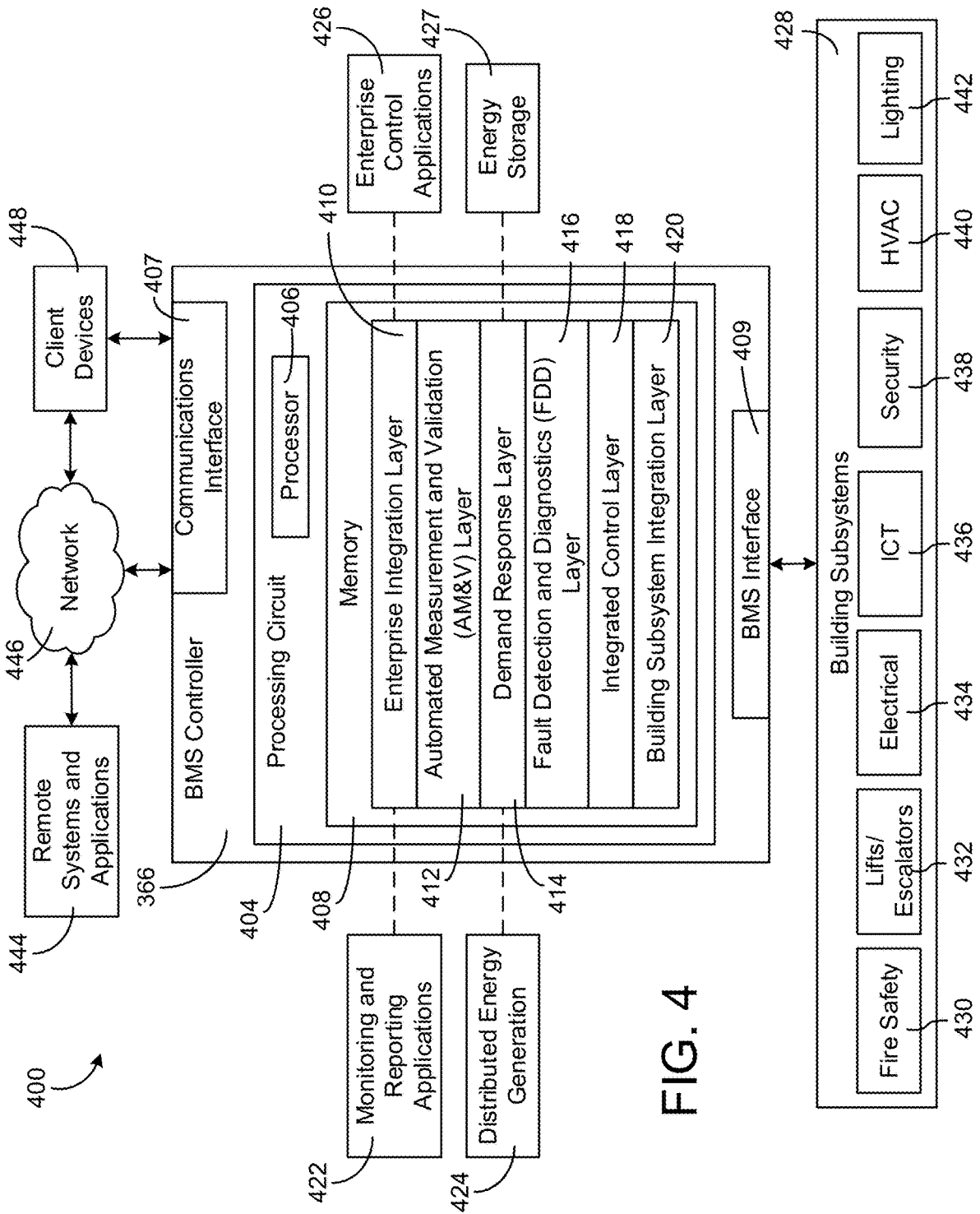
FIG. 4 is a block diagram of a BMS which can be used in the building of FIG. 1, according to some embodiments.
Figure 5:
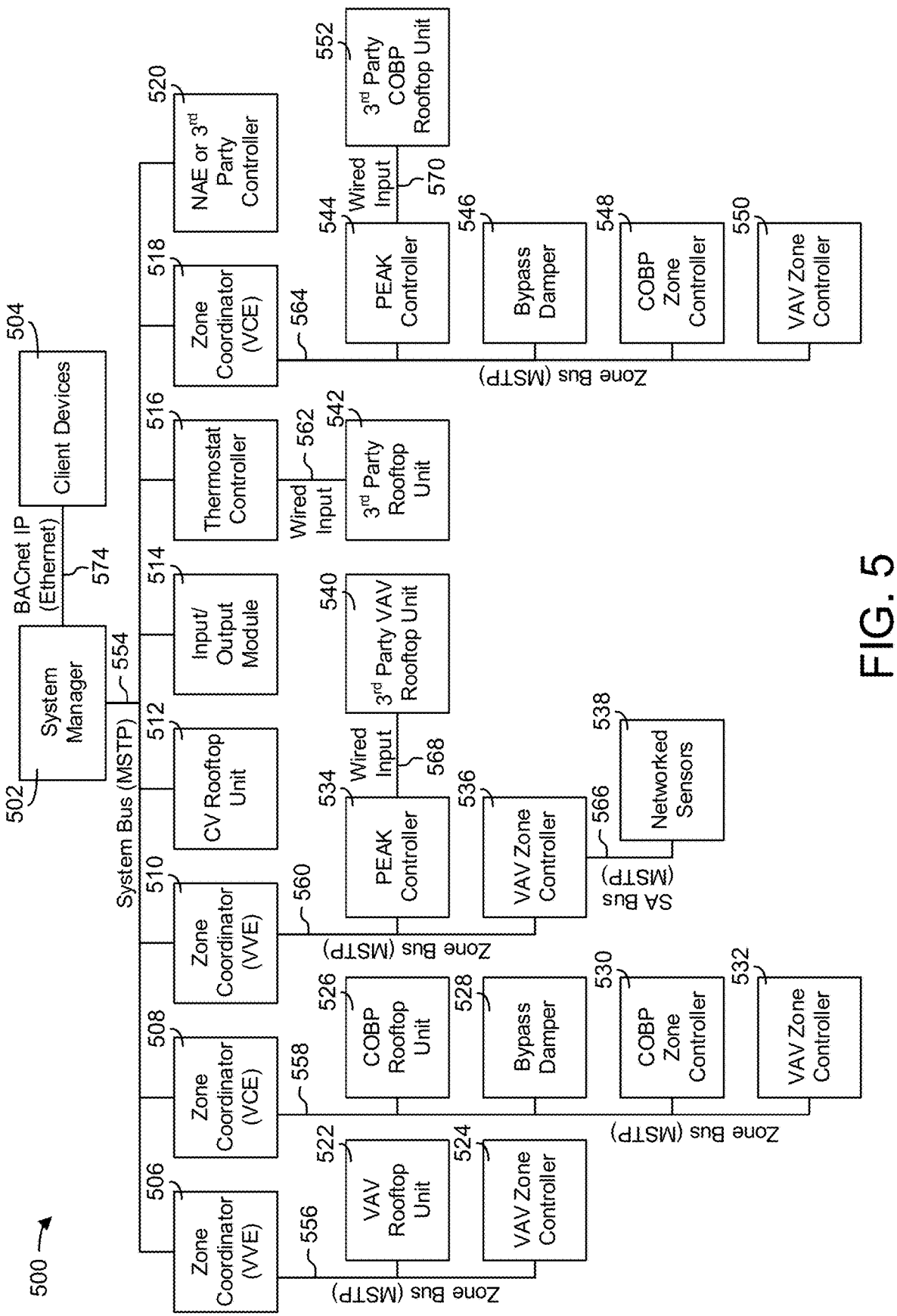
FIG. 5 is another block diagram of a BMS which can be used in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD)

layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/ output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs)

connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Access Management System with Access Manager Platform

Figure 6:
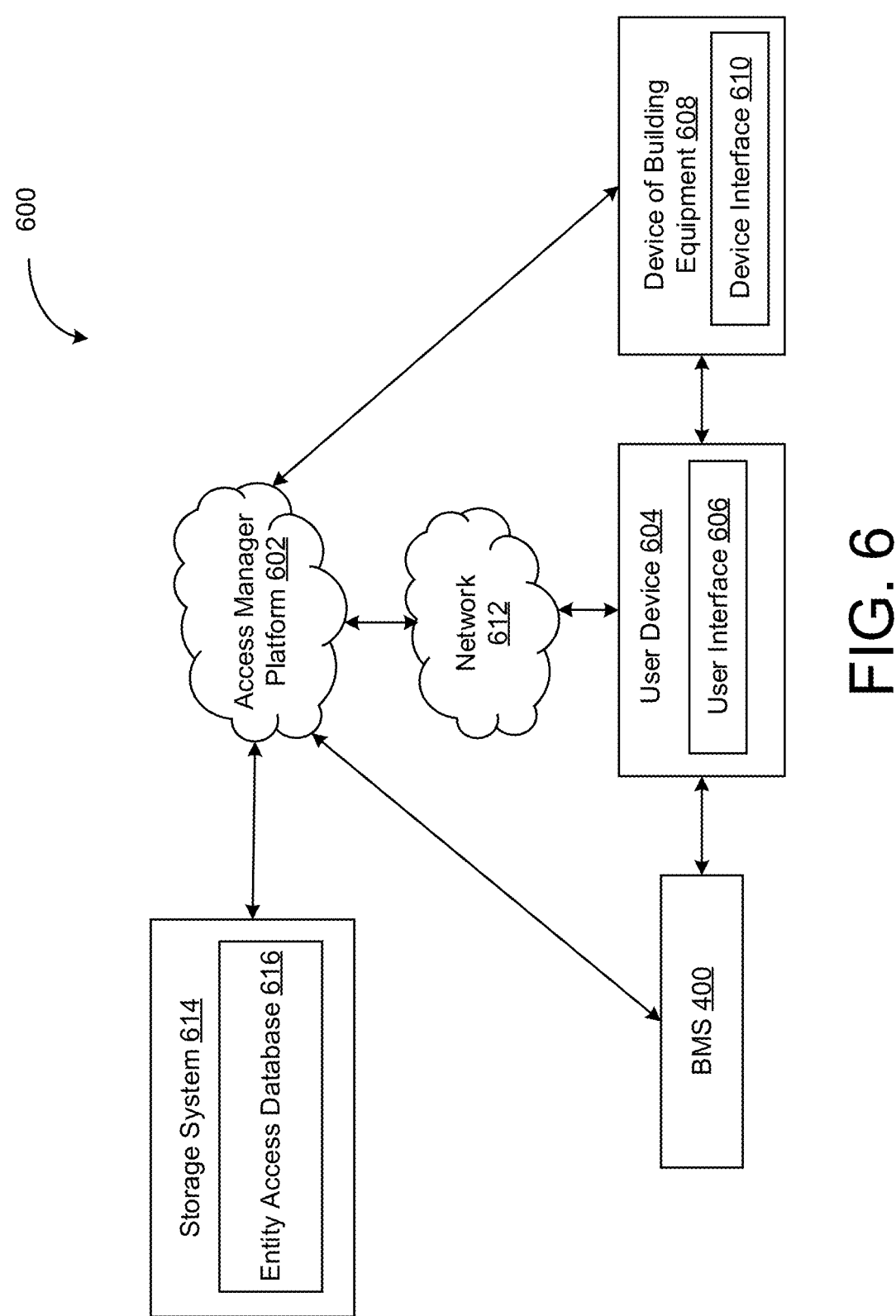
FIG. 6 is a block diagram of an access management system which can be used with components of the building of FIG. 1, according to some embodiments.

Referring now to FIG. 6, a block diagram of an access management system 600 is shown, according to an exemplary embodiment. The access management system 600 is shown to include an access manager platform 602, a user device 604 having a user interface 606, and a device of building equipment (hereinafter "device 608") having a device interface 610. The access management system 600 may also include one or more building management systems (e.g., the BMS 400), a network 612, and a storage system 614 having an entity access database 616. As will be discussed in greater detail below, the access manager platform 602 may be configured to receive an access request from an entity to access a device, determine the access level of the entity based on the access request, generate an access code indicating the access level of the entity, and transmit the access code to allow access to a set of functions of a the device.

As used herein, the term "access," "device access," "access to a device of building equipment," and like terms refer to the ability of an entity to monitor and/or control functions of a device of building equipment. In an exemplary embodiment, an entity accesses a device of building equipment via a device interface (e.g., control panel) of the device of building equipment. Further, access may allow an entity to monitor and/or control various functions of a device of building equipment, or a plurality of devices of building equipment. For example, access may allow an entity (e.g., user) to navigate a device interface and view data displayed on the interface, modify setpoints required to operate the device, modify standard operating features or functions of the device, and/or perform maintenance on the device.

According to an exemplary embodiment, the access manager platform 602 is configured to communicate with other components of the access management system 600. For example, the access manager platform 602 may communicate with the user device 604 (e.g., via the user interface 606, the network 612, etc.). In some embodiments, the access manager platform 602 is configured to communicate with the device 608 (e.g., via the device interface 610, etc.), components of the BMS 400 (e.g., subsystems 430-440, etc.), the storage system 614, and/or any other device or system of the access management system 600.

As shown in FIG. 6, the access manager platform 602 is configured to communicate with the user device 604 (e.g., via the network 612). The user device 604 may include one or more human-machine interfaces or client interfaces, shown as the user interface 606 (e.g., a graphical user interface, reporting interface, text-based computer interface, client-facing web service, web servers that provide pages to a web client, etc.) for controlling, viewing, and/or otherwise interacting with the access manager platform 602. The user device 604 may be a mobile device or a stationary terminal. For example, the user device 604 may be a smartphone, a tablet, a PDA, a laptop computer, a desktop computer, a computer workstation, a client terminal, a computer server with an interface, a remote or local interface, and/or any other type of mobile or non-mobile user interface device.

In some embodiments, the access manager platform 602 is configured to communicate with the device 608. Like the user device 604, the device 608 may include one or more human-machine interfaces or client interfaces, shown as device interface 610, for controlling, viewing, and/or otherwise interacting with the device 608. According to an exemplary embodiment, the device 608 is a chiller, for example a chiller of the BMS 400, the BMS 500, and/or another suitable building management system. In some embodiments, the device 608 is another device of an HVAC system (e.g., a heater, air handling unit, pumps, fans, thermal energy storage, etc., and/or another device configured to provide heating, cooling, ventilation, or other services for a building). In other embodiments, the device 608 is a device of an energy generation and/or storage system, a security system, a lighting system, a fire alerting system, and/or a device of any other system capable of managing building functions or devices, or any combination thereof. In yet other embodiments, the device 608 is an internet of things (IoT) device capable of communicating with the access manager platform 602.

In some embodiments, the access manager platform 602 is also configured to communicate with components of one or more building management systems (e.g., the BMS 400, the BMS 500, etc.). For example, the access manager platform 602 may communicate with components of the subsystems 430-440, the BMS controller 366, the memory 408, and/or another component of the BMS 400. The access manager platform 602 may also communicate with the system manager 502, and/or another component of the BMS 500. In other embodiments, the access manager platform 602 is configured to communicate with another device and/or system of another suitable building management system.

In other embodiments, the access manager platform 602 is also configured to communicate with the storage system 614 (e.g., having the entity access database 616), either directly or indirectly (e.g., via the user device 604, the device 608, etc.). The storage system 614 may include one or more devices (e.g., RAM, ROM, Flash memory, hard disk storage, etc.) for storing data and/or computer code for completing and/or facilitating various processes, layers, and modules described herein. The storage system 614 may be or include volatile memory or non-volatile memory, and may include database components, object code components, script components, and/or any other type of information structure for supporting the various activities and information structures described herein.

According to an exemplary embodiment, and as will be discussed in greater detail below, the access manager platform 602 is also configured to generate data. For example, the access manager platform 602 may include components (e.g., a device identification module, an entity access module, an access level module, an access profile database, an access security module, an access request analyzer, a code generator, an access database, etc.) that receive, analyze, process, generate, store, and/or communicate data. The data generated by the access manager platform 602 may be analyzed, processed, stored, etc. along with data received from other data sources discussed above. Further, the access manager platform 602 may communicate data generated by the access manager platform 602, for example to initiate an automated action by one or more components of the access management system 600 (e.g., provide an access code to the user device 604, permit access to the device 608, permit access to a predetermined set of functions of the device 608, control a device of the BMS 400, etc.).

Access Manager Platform

Figure 7:
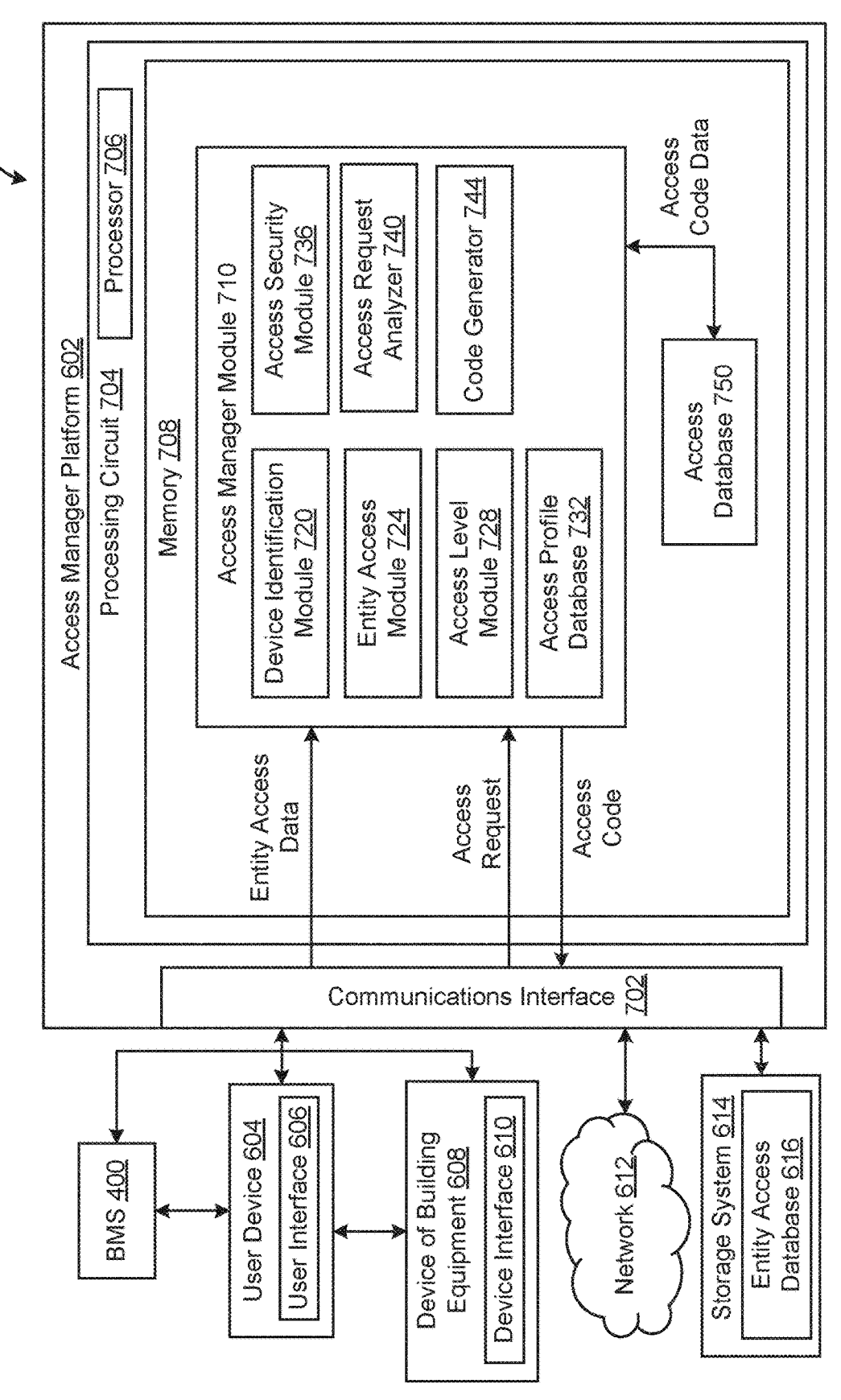
FIG. 7 is a block diagram of an access manager platform which can be used in the access management system of FIG. 6, according to some embodiments.

Referring now to FIG. 7, a block diagram illustrating the access manager platform 602 in greater detail is shown, according to an exemplary embodiment. As discussed above, the access manager platform 602 may be configured to receive an access request from an entity to access a device, determine the access level of the entity based on the access request, generate an access code indicating the access level of the entity, and transmit the access code to allow access to a set of functions of the device. According to an exemplary embodiment, the access manager platform 602 receives an access request from the user device 604 (e.g., via the user interface 606), the access request indicating the device 608 to which access is requested and an identity of the entity requesting access. The access manager platform 602 may also be configured to determine an access level of the entity from a plurality of access profiles stored in an access profile database based on the device 608 and the identity of the entity, and generate an encrypted access code indicating the access level of the entity. Further, the access manager platform 602 may transmit the encrypted access code to the user device 604 (e.g., via the user interface 606), which grants access to the device 608 when the access code is entered at the device 608. In this regard, the access manager platform 602 may receive an access request, analyze the access request, and provide an encrypted access code that permits an entity (e.g., via the user device 604) to access a set of functions of the device 608.

As shown in FIG. 7, the access manager platform 602 is communicably connected to the user device 604 (e.g., via the user interface 606), the device 608 (e.g., via the device interface 610), and the BMS 400. According to an exemplary embodiment, the access manager platform 602 is configured to communicably connect the user device 604 and the device 608, such that the access manager platform 602 allows the user device 604 and/or the device 608 to interact without being part of a connected network (e.g., the network 612). In some embodiments, the access manager platform 602 is communicably connected to the network 612, the storage system 614, and/or other suitable systems and/or devices. It should be understood that some or all of the components of the access manager platform 602, the user device 604, the device 608, the BMS 400, etc. may be implemented as part of a cloud-based computing system configured to receive, process, and/or communicate data from one or more external devices or sources. Similarly, some or all of the components of the access manager platform 602, the user device 604, the device 608, the BMS 400, etc. may be implemented within a single device, or distributed across multiple separate systems or devices. In some embodiments, some or all of the components of the access manager platform 602 are components of a subsystem level controller, a plant controller, a device controller, a field controller, a computer workstation, a client device, and/or another system or devices that receives, processes, and/or communicates data from/to devices or other data sources.

The access manager platform 602 is shown to include a communications interface 702 and a processing circuit 704 having a processor 706 and a memory 708 (e.g., having an access manager module 710). The communications interface 702 may include wired or wireless communications interfaces (e.g., jacks, antennas, transmitters, receivers, transceivers, wire terminals, etc.) for communicating data between the access manager platform 602 and external systems or devices (e.g., the BMS 400, the user device 604, the device 608, etc.). In some embodiments, the communications interface 702 facilitates communication between the access manager platform 602 and external applications (e.g., remote systems and applications), so as to allow a remote entity or user to control, monitor, and/or adjust components of the access manager platform 602. Communications conducted via the communications interface 702 may be direct (e.g., local wired or wireless communications), or via the network 612 (e.g., a WAN, the Internet, a cellular network, etc.). Further, the communications interface 702 may be configured to communicate with external systems and/or devices using any of a variety of communications protocols (e.g., HTTP(S), WebSocket, CoAP, MQTT, etc.), industrial control protocols (e.g., MTConnect, OPC, OPC-UA, etc.), process automation protocols (e.g., HART, Profibus, etc.), home automation protocols, and/or any of a variety of other protocols. Advantageously, the access manager platform 602 may obtain, ingest, and process data from any type of system or device, regardless of the communications protocol used by the system or device.

According to an exemplary embodiment, the access manager platform 602 communicates with the user device 604 and/or another external device or system (e.g., via the communications interface 702, the network 612, etc.). For example, the access manager platform 602 may receive entity access data from the user device 604, which may include data received via the user interface 606 (e.g., input via a user). As will be discussed in greater detail below, the access manager platform 602 may receive entity access data that includes device data, entity data, access level data, security data, and/or any other suitable data relating to device access of the entity. The access manager platform 602 may further be configured to store, process, and/or communicate information relating to the entity access data to other components of the access management system 600, as discussed below.

In an exemplary embodiment, the access manager platform 602 receives an access request (e.g., access request data) from the user device 604 (e.g., via the user interface 606). For example, the access manager platform 602 may receive an access request that includes device data of a device requested to be accessed, and entity data of the entity requesting access. According to an exemplary embodiment, the access manager platform 602 is further configured to process, store, and/or communicate information relating to the access request to other components of the access management system 600. For example, the access manager platform 602 may process the access request, and/or generate and communicate an encrypted access code to the user device 604, which may be used to access the device when the encrypted access code is entered. In this regard, the access manager platform 602 may receive an access request (e.g., including device identification data and entity data), process and store the access request, and communicate an encrypted access code that may be used by the entity to access the device, as discussed below.

As shown in FIG. 7, in some embodiments the access manager platform 602 is also configured to communicate with the device 608, components of the BMS 400, and/or the storage system 614. The storage system 614 is shown to include the entity access database 616, which may receive, store, and/or communicate data relating to device access of an entity or user. For example, the entity access database may receive, store, and/or communicate device data, entity data, access level data, security data, access request data, device access data, and/or any other suitable data relating to device access of the entity.

Referring still to FIG. 7, the access manager platform 602 is generally shown to include the processing circuit 704 having the processor 706 and the memory 708. While shown as single components, it will be appreciated that the access manager platform 602 may include one or more processing circuits including one or more processors and memory. In some embodiments, the access manager platform 602 includes a plurality of processors, memories, interfaces, and other components distributed across multiple devices or systems that are communicably coupled. For example, in a cloud-based or distributed implementation, the access manager platform 602 may include multiple discrete computing devices, each of which includes a processor 706, memory 708, communications interface 702, and/or other components of the access manager platform 602 that are communicably coupled. Tasks performed by the access manager platform 602 may be distributed across multiple systems or devices, which may be located within a single building or facility, or distributed across multiple buildings or facilities. In other embodiments, the access manager platform 602 itself is implemented within a single computer (e.g., one server, one housing, etc.). All such implementations are contemplated herein.

The processor 706 may be a general purpose or specific purpose processor, an application specific integrated circuit (ASIC), one or more field programmable gate arrays (FPGAs), a group of processing components, or other suitable processing components. The processor 706 may further be configured to execute computer code or instructions stored in the memory 708 or received from other computer readable media (e.g., CDROM, network storage, a remote server, etc.).

The memory 708 may include one or more devices (e.g., memory units, memory devices, storage devices, etc.) for storing data and/or computer code for completing and/or facilitating the various processes described in the present disclosure. The memory 708 may include random access memory (RAM), read-only memory (ROM), hard drive storage, temporary storage, non-volatile memory, flash memory, optical memory, or any other suitable memory for storing software objects and/or computer instructions. In some embodiments, the memory 708 includes database components, object code components, script components, and/or any other type of information structure for supporting the various activities and information structures described in the present disclosure. The memory 708 may be communicably connected to the processor 706 via the processing circuit 704, and may include computer code for executing (e.g., by the processor 706) one or more processes described herein. When the processor 706 executes instructions stored in the memory 708, the processor 706 may generally configure the processing circuit 704 to complete such activities.

Referring still to FIG. 7, the access manager platform 602 (e.g., the access manager module 710) is shown to include a device identification module 720, an entity access module 724, an access level module 728, an access profile database 732, an access security module 736, an access request analyzer 740, a code generator 744, and an access database 750. As discussed above, the access manager module 710 (e.g., components 720-744) may receive entity access data from the user device 604 (e.g., via the user interface 606), and/or another suitable device or system (e.g., the storage system 614, etc.). The entity access data may include, for example, device data, entity data, access level data, security data, and/or any other suitable data relating to the device access of an entity. In some embodiments, the access manager module 710 (e.g., components 720-744) is configured to store, process, modify, and/or communicate the entity access data, for example for additional processing. In an exemplary embodiment, the access manager module 710 (e.g., components 720-744) also receives an access request, processes the access request, and generates and communicates an encrypted access code that may be used to access a device.

According to an exemplary embodiment, the device identification module 720 is configured to receive device data. Device data may include a unique device identity code (e.g., the device 608), a plurality of unique identity codes of each of a plurality of devices, characteristics of a device or a plurality of devices (e.g., year, make, model, device configuration, component parts, component part configuration, etc.), characteristics of a device component or part (e.g., motor, condenser, pump, heat exchanger, software, security key, etc.), and/or other suitable data relating to a device and/or a plurality of devices. In an exemplary embodiment, the device identification module 720 is configured to store device data relating to a device or a plurality of devices, and/or communicate device data to one or more components of the access manager module 710, for example for additional processing.

In an exemplary embodiment, the entity access module 724 is configured to receive entity data. Entity data may include entity identification information (e.g., name, entity type, username, entity email address, size, location or locations, etc.), an entity level password, and/or other entity level information (e.g., entity level email address, entity access level or levels, number of users, etc.). The entity data may also include user identification information (e.g., username, name, email address, telephone number, address, etc.), user passwords, and/or other user information (e.g., job title, user qualifications, user access level or levels, job location, etc.). In some embodiments, entity data includes temporary user identification information (e.g., temporary username, name, email address, telephone number), temporary user passwords, and/or other temporary user information (e.g., entity name, job title, temporary user qualifications, temporary user access level or levels, etc.). In this regard, an entity, owner (e.g., device owner), or other user of the user device may be permitted to grant different entities (e.g., based on entity data) varying levels of access to a device or plurality of devices, as discussed below. In an exemplary embodiment, the entity access module 724 stores entity data relating to an entity and/or a plurality of entities, as well as a user and/or a plurality of users. In some embodiments, the entity access module 724 also communicates entity data to one or more components of the access manager module 710, for example for additional processing.

In an exemplary embodiment, the access level module 728 is configured to receive access level data. Access level data may include a set of functions, of a device or plurality of devices, accessible to an entity and/or user or plurality of users. For example, a first access level may allow a user to navigate a device interface and view data displayed on the interface. A second access level may allow a user to modify setpoints required to operate the device (e.g., start/stop the device, reset warning indicators, clear device fault indicators, etc.). A third access level may allow a user to modify standard operating features of the device (e.g., adjust motor lube settings, enable motor monitoring, enable or disable harmonic filtering, define condenser pressure thresholds, clear planned maintenance warnings, etc.). A fourth access level may allow a user to perform maintenance on the device (e.g., repair device components, replace device components, tune and/or modify component parts, etc.). In some embodiments, the access level data includes a set of functions, of a device or plurality of devices, accessible to an entity, user, and/or third party. For example, another access level may allow a technician or service representative to view data relating to the device (e.g., historic data on device use, maintenance, etc.). In an exemplary embodiment, the access level module 728 also stores access level data relating an access level or plurality of access levels, and/or communicates access level data to one or more components of the access manager module 710, for example for additional processing.

In an exemplary embodiment, the access profile database 732 is configured to receive device data, entity data, and/or access level data. For example, the access profile database 732 may receive device data from the device identification module 720, entity data from the entity access module 724, and/or access level data from the access level module 728. In an exemplary embodiment, the access profile database 732 also generates and/or stores access profiles that represent the access level (or plurality of access levels) available on a device (or plurality of devices) to a specific entity and/or user. For example, the access profile database 732 may generate and store a view access profile, which represents first level access (e.g., view and navigate a device interface) is available on a plurality of devices (e.g., chillers) to a user with entity level identification (e.g., entity level email address). In some embodiments, the access profile database 732 generates and stores a standard access profile, which represents second level access (e.g., modify setpoints to operate the device) is available on a plurality of devices (e.g., chillers) to a user having an entity level identification and password (e.g., a device owner, entity manager or operator, etc.). In other embodiments, the access profile database 732 generates and stores an enhanced access profile, which represents third level access (e.g., modify standard operating features of the device) is available on a device (e.g., chiller) to a user having a specified username and password (e.g., based on the user's ownership of the device, job title, qualifications, training, etc.). In yet other embodiments, the access profile database 732 generates and stores a service access profile, which represents fourth level access (e.g., repair and/or replace component parts) is available on a device (e.g., chiller) to a user that has an entity level identification and a specified username and/or password (e.g., an entity level technician with qualifications, training, etc.). It should be understood that while view, standard, enhanced, and service access profiles are described herein, the access profile database 732 may generate and/or store any number of access profiles, which relate any suitable combination of device data, entity data, and/or access level data.

In an exemplary embodiment, the access security module 736 is configured to receive security data. In an exemplary embodiment, security data includes access code start times and/or lockouts, password lockouts, incorrect password access delays, access warning indicators, automatic and/or manual lockdowns or timeouts, etc. for a device or plurality of devices. In some embodiments, security data includes entity level access restrictions, user restrictions, username and/or password lockouts, etc. In other embodiments, security data includes access level faults, fault thresholds, warning indicators, and/or any other suitable security data relating to a device, entity or user, and/or access level. In an exemplary embodiment, the access security module 736 stores security data, and/or communicates security data to one or more components of the access manager module 710, for example for additional processing.

As discussed above, in an exemplary embodiment the access manager module 710 is also configured to receive an access request, for example from the user device 604 (e.g., via the user interface 606) and/or another suitable device or system (e.g., the storage system 614, etc.). In an exemplary embodiment, the access request analyzer 740 receives an access request that includes device data relating to a device which access is requested, and entity data relating to the entity requesting access. For example, the access request may include a device identity code (e.g., of the device 608) and an entity level identification (e.g. an entity level email of a user of the user device 604). In some embodiments, the access request includes a device identity code having specific characteristics (e.g., a specific model of the device 608) and user identification information (e.g., a username and/or password of the user of the user device 604). According to an exemplary embodiment, the access request analyzer 740 is also configured to receive and/or store a plurality of access profiles, for example from the access profile database 732. As discussed above, the plurality of access profiles may include device data, entity data, and/or access level data, such that the access profiles represent an access level or plurality of access levels, available on a device or plurality of devices, of an entity or user.

In an exemplary embodiment, the access request analyzer 740 is also configured to process an access request and/or communicate access data or an access profile. According to an exemplary embodiment, the access request analyzer 740 receives an access request, compares the access request to a plurality of access profiles, and determines an access level based on the access request. More specifically, the access request analyzer 740 may receive an access request (e.g., that includes device and entity data), and a plurality of access profiles (e.g., that include combinations of device, entity, and access level data). The access request analyzer 740 may compare the device and entity data of the access request, to device and entity data of the plurality of access profiles. Based on the comparison, the access request analyzer 740 may determine an access level or levels of an entity (or user) associated with the entity data, to the device (or plurality of devices) associated with the device data. The access request analyzer 740 may further communicate the access request data and the determined access level (e.g., in the form of access data) to other components of the access manager module 710, for example for additional processing. In some embodiments, the access request analyzer 740 is configured to compare the access request data to the plurality of access profiles, and determine the access profile that relates to the device and entity data of the access request. The access request analyzer 740 may further communicate the determined access profile to other components of the access manager module 710, for example for additional processing. In other embodiments, the access request analyzer 740 stores the access data and/or the access profiles, for example for use in subsequent access requests and/or additional processing.

As an illustrative example, the access request analyzer 740 may receive an access request that includes a device identity code (e.g., of the device 608) and an entity level identification (e.g. an entity level email of a user of the user device 604). The access request analyzer 740 may also receive a plurality of access profiles, each having a combination of device data, entity data, and access level data. In an exemplary embodiment, the access request analyzer 740 compares the device identity code and entity level identification to the plurality of access profiles (e.g., the device and entity data of each access profile). Based on the comparison, the access request analyzer 740 may determine, for example, that the entity level identification (e.g., entity level email) has first level access (e.g., view access) to the device 608. The access request analyzer 740 may further communicate the device identity code, the entity level identification, and the determined access level (e.g., in the form of access data) to other components of the access manager module 710. In some embodiments, the access request analyzer 740 compares the device identity code and entity level identification to the plurality of access profiles, and based on the comparison determines an access profile associated with the device identity code and entity level identification. The access request analyzer 740 may further communicate the determined access profile to other components of the access manager module.

In an exemplary embodiment, the code generator 744 is configured to receive data from components of the access manager module 710 and/or other devices or systems. For example, the code generator 744 may receive access data (e.g., device, entity, and access level data) from the access request analyzer 740, and/or a determined access profile from the access request analyzer 740, as discussed above. In some embodiments, the code generator 744 also receives security data from the access security module 736, access profile data from the access profile database 732, and/or any other suitable data relating to device access of an entity or user, an access request, a device, an entity or user, and/or an access level or levels.

According to an exemplary embodiment, the code generator 744 is also configured to generate and/or communicate an access code that may be used to access a device. In an exemplary embodiment, the access code is and encrypted access code that is communicated to the user device 604, and represents an access level, of an entity or user of the user device 604, to a device or plurality of devices (e.g., the device 608). In this regard, the access code may allow an entity or user to access a predetermined set of functions, on a device or plurality of devices, when the access code is entered at the device. The access code may include security features or settings, for example access code start times and/or timeouts, access code or device lockouts, maximum access code attempt faults, and/or any other suitable security feature for ensuring appropriate access. The access code may also include other data relating to a device, entity or user, and/or access level (e.g., a unique code identifier, a device serial number, a unique entity identifier, an access level code, etc.). According to an exemplary embodiment, the encrypted access code is a 12 digit alphanumeric code; however, in other embodiments the access code is another suitable code and/or of any suitable length (e.g., 10, 25, 36, etc.). As will be discussed in greater detail below, when the encrypted access code is entered by a user at the device, the device may decrypt the encrypted access code (e.g., via a security key) so as to allow the user access to a predetermined set of functions of the device corresponding to the access level of the user.

As an illustrative example, the code generator 744 may receive access data (e.g., an identity code of the device 608, an entity level identification, and first level access data) and/or security data (e.g., access code timeout) from components of the access manager module 710. The code generator 744 may process the data, generate an encrypted access code (e.g., including the identity code, entity level identification, first level access data, and access code timeout), and communicate the encrypted access code to the user device 604. When the encrypted access code is entered at the device 608, the device 608 may decrypt the access code and allow, for example, the user to navigate an interface of the device 608 for the predetermined timeout period. As another illustrative example, the code generator 744 may receive an enhanced access profile (e.g., an identity code of the device 608, a specified username and/or password, and third level access data) and/or security data (e.g., an access code start time). The code generator 744 may process the data, generate an encrypted access code, and communicate the encrypted access code to the user device 604. When the encrypted access code is entered at the device 608, the device 608 may decrypt the access code and allow, for example, a qualified technician to modify standard operating features of the device 608 after the predetermined access start time.

In an exemplary embodiment, the code generator 744 is configured to communicate the encrypted access code to the user device 604 (e.g., via the user interface 606); however, in some embodiments the code generator 744 communicates the encrypted access code to other devices and/or systems. For example, the code generator 744 may communicate access code data to the access database 750. The access database 750 may be configured to receive, store, and/or communicate access code data, for example for subsequent access code request processing. In some embodiments, the access database 750 also receives, stores, and/or communicates device data (e.g., via the device identification module 720), entity data (e.g., via the entity access module 724), access level data (e.g., via the access level module 728), access profile data (e.g., via the access profile database 732), security data (e.g., via the access security module 736), access request data (e.g., via the access request analyzer 740), and/or any other suitable data relating to entity access to a device.

User Device

Figure 8:
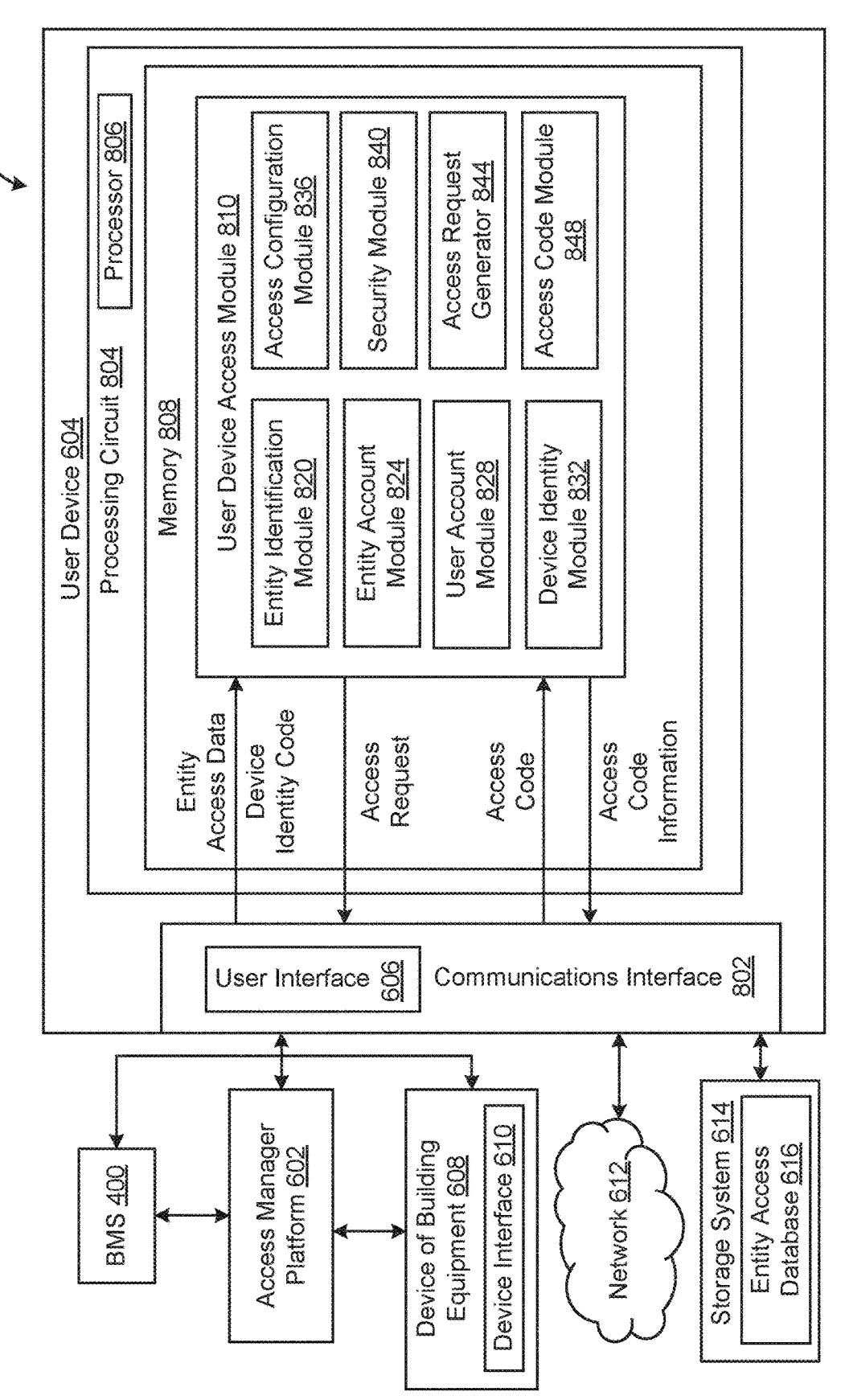
FIG. 8 is a block diagram of a user device which can be used in the access management system of FIG. 6, according to some embodiments.

Referring now to FIG. 8, a block diagram illustrating the user device 604 in greater detail is shown, according to an exemplary embodiment. In an exemplary embodiment, the user device 604 is configured to receive, process, store, and/or communicate entity access data (e.g., via the user interface 606). The user device 604 may also receive device data, for example a device identity code from a device (e.g., the device 608). In an exemplary embodiment, the user device 604 is configured to process the entity access data and/or device data, and generate an access request. The user device 604 may communicate the access request to another device or system (e.g., the access manager platform 602), and/or receive an encrypted access code that allows a user to access the device 608. In some embodiments, the user device 604 is also configured to communicate the encrypted access code to another device and/or system (e.g., the device 608), so as to allow the user to access the device 608.

The user device 604 is generally shown to include a communications interface 802 and a processing circuit 804 having a processor 806 and a memory 808 (e.g., having a user device access module 810). The communications interface 802 may include the user interface 606, and may include wired or wireless communications interfaces for communicating data between the user device 604 and external systems or devices. While shown as single components, it will be appreciated that the user device 604 may include one or more processing circuits including one or more processors and memory. In some embodiments, the user device 604 includes a plurality of processors, memories, interfaces, and other components distributed across multiple devices or systems that are communicably coupled. As discussed above with regard to processor 706 and/or memory 708, processor 806 may include any suitable processing components configured to execute computer code or instructions stored in the memory 808, and memory 808 may include one or more devices for storing data and/or computer code for completing and/or facilitating the various processes described herein.

As shown in FIG. 8, the user device 604 (e.g., the user device access module 810) includes an entity identification module 820, an entity account module 824, a user account module 828, a device identity module 832, an access configuration module 836, a security module 840, an access request generator 844, and an access code module 848. As discussed above, the user device access module 810 (e.g., components 820-844) is configured to receive entity access data (e.g., via the user interface 606), which may include entity data, device data, access level configuration data, security data, and/or any other suitable data relating to an entity, device, and/or access level. In an exemplary embodiment, the user device access module 810 (e.g., components 820-844) also stores, processes, and/or communicates the entity access data, for example in the form of an access request. The access request may include, for example a device identity code indicating the device 608 to which access is requested, and a user identifier indicating the user requesting access (e.g., a user of the user device 604). The user device access module 810 may further receive an encrypted access code, which may be used to access a device, as will be discussed below.

According to an exemplary embodiment, modules 820-828 are configured to receive entity data, for example via input from a user accessing one or more user interfaces (e.g., user interface 606). In some embodiments, entity data is received via input from another suitable device or system (e.g., storage system 614, a component of the BMS 400, etc.). According to an exemplary embodiment, the entity identification module 820 receives entity data that includes entity identification information (e.g., entity name, entity type, entity email address, size, location or locations, etc.). The entity account module 824 may receive entity data that includes an entity level username, an entity level password, and/or other entity level information (e.g., entity level email address, entity access level or levels, number of users, etc.). In an exemplary embodiment, the user account module 828 receives entity data that includes user identification information (e.g., username, name, email address, telephone number, address, etc.), user passwords, and/or other user information (e.g., job title, user qualifications, user access level or levels, job location, etc.). The user account module 828 may also receive entity data that includes temporary user identification information, temporary user passwords, and/or other temporary user information. According to an exemplary embodiment, the modules 820-828 are also configured to store and/or communicate entity data to components of the user device access module 810 and/or the access manager platform 602, for example for additional processing.

In an exemplary embodiment, the device identity module 832 is configured to receive device data, for example via input from the user interface 606 and/or an interface of a device (e.g., the device interface 610 of the device 608). In an exemplary embodiment, the device interface 610 displays a code (e.g., a QR code, alphanumeric code, etc.) that represents device data of the device 608. The user device 604 may obtain the code via components of the user device (e.g., scan via a camera, etc.) and/or the user interface 606 (e.g., input, etc.), and the device data may be received by the device identity module 832. In some embodiments, device data is received via input from another suitable process, device, and/or system (e.g., proximity tags, RFID tags, communication from the storage system 614, a component of the BMS 400, etc.). According to an exemplary embodiment, device data includes a unique device identity code (e.g., identity code of the device 608); however, in other embodiments, the device data includes characteristics of the device, characteristics a component or part of the device, other suitable data relating to the device, and/or a combination thereof. According to an exemplary embodiment, the device identity module 832 is also configured to store and/or communicate device data to components of the user device access module 810 and/or the access manager platform 602, for example for additional processing.

In an exemplary embodiment, the access configuration module 836 is configured to receive access level configuration data, for example via input from a user accessing one or more user interfaces (e.g., user interface 606). In some embodiments, access level configuration data is received via input from another suitable device or system (e.g., storage system 614, a component of the BMS 400, etc.). According to an exemplary embodiment, access level configuration data includes an accessible set of functions, of a device or a plurality of device, at one or more defined access levels. For example, access level configuration data may include data that defines a first access level that allows a user to navigate a device interface and view data displayed on the interface, a second access level that allows a user to modify setpoints required to operate the device, a third access level that allows a user to modify standard operating features of the device, a fourth access level that allows a user to perform maintenance on the device, etc. In an exemplary embodiment, the access configuration module 836 stores and/or communicates access level configuration data to components of the user device access module 810 and/or the access manager platform 602, for example for additional processing.

In an exemplary embodiment, the security module 840 is configured to receive security data, for example via input from a user accessing one or more user interfaces (e.g., user interface 606). In some embodiments, security data is received via input from another suitable device or system (e.g., storage system 614, a component of the BMS 400, etc.). According to an exemplary embodiment, security data includes access code start times and/or timeouts, password lockouts, incorrect password access delays, access warning indicators, automatic and/or manual lockdowns or timeouts, etc. for a device or plurality of devices. Security data may also include entity level access restrictions, user restrictions, username and/or password lockouts, as well as access level faults, fault thresholds, warning indications, and/or any other suitable security data relating to a device, entity or user, and/or access level. In an exemplary embodiment, the security module 840 stores and/or communicates security data to components of the user device access module 810 and/or the access manager platform 602, for example for additional processing.

According to an exemplary embodiment, the access request generator 844 is configured to receive data from components of the user device access module 810, and generate an access request. As discussed above, the access request may include entity data relating to the entity requesting access, and device data relating to a device which access is requested. In an exemplary embodiment, the access request generator 844 receives entity data from the modules 820-828, for example an entity level email associated with a user of the user device 604, a username and/or password, a username and/or entity password, etc. The access request generator 844 may also receive device data from the device identity module 832, for example a device identity code (e.g., the device identity code of the device 608), a device identity code and a device characteristic (e.g., make, model, etc.), etc. According to an exemplary embodiment, the access request generator 844 generates an access request that includes the entity data and device data, for example the username and entity password of the user of the user device 604 and the device identity code of the device 608. The access request generator 844 may communicate the access request to other components of the user device access module 810 and/or the access manager platform 602, as discussed above. In other embodiments, the access request generator 844 generates an access request that includes other suitable data (e.g., data received from components of the user device access module 810, etc.).

In an exemplary embodiment, the access code module 848 is also configured to receive an encrypted access code that may be used to access a device. The access code module 848 may receive the encrypted access code from the access manager platform 602, as discussed above, and/or another suitable device or system (e.g., the storage system 614, etc.). According to an exemplary embodiment, the access code module 848 receives the encrypted access code when the user device 604 is disconnected from the internet and/or a network (e.g., via Bluetooth, etc.). In other embodiments, the access code module 848 receives the encrypted access code when the user device 604 is connected to a communications network (e.g., internet, WiFi, the network 612, etc.). According to an exemplary embodiment, the access code module 848 stores and/or communicates the encrypted access code to other components of the user device 604, for example the user interface 606 (e.g., to display to a user, a device interface, etc.) and/or the communications interface 802 (e.g., for communication to other devices and/or systems). In this regard, the access code module 848 is configured to receive and communicate an encrypted access code, so as to allow a user to access a predetermined set of functions on a device.

Device of Building Equipment

Figure 9:
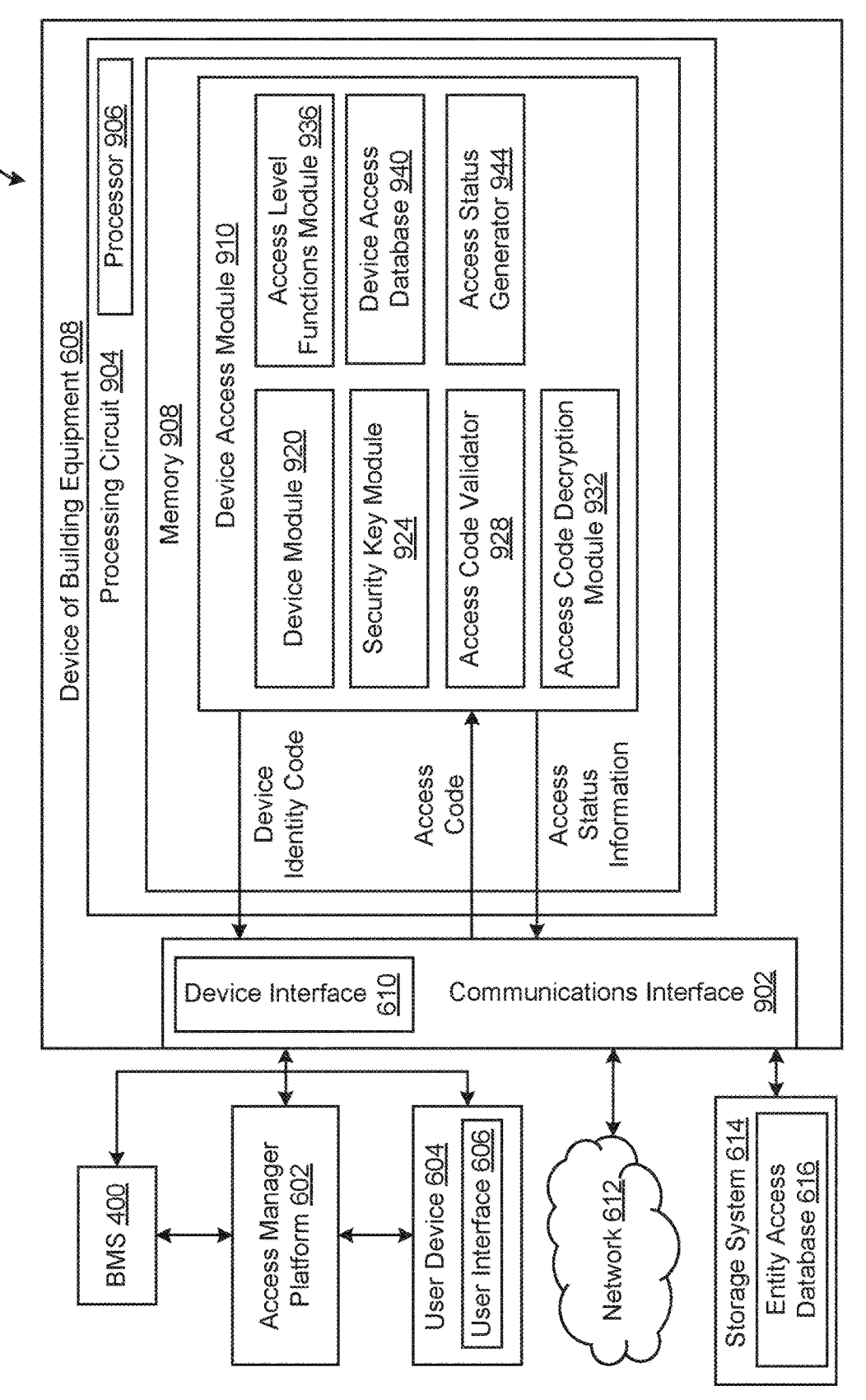
FIG. 9 is a block diagram of a device of building equipment which can be used in the web service system of FIG. 6, according to some embodiments.

Referring now to FIG. 9, a block diagram illustrating the device of building equipment (e.g., the device 608) in greater detail is shown, according to an exemplary embodiment. In an exemplary embodiment, the device 608 is configured to process, store, and/or communicate device data (e.g., via the device interface 610). The device 608 may also be configured to receive a security key, which is may be used to decrypt an encrypted access code so as to allow a user access to a predetermined set of functions of the device 608. In other embodiments, the device 608 is configured to provide a status indication to a user and/or external device or system.

The device 608 is generally shown to include a communications interface 902 and a processing circuit 904 having a processor 906 and a memory 908 (e.g., having a device access module 910). The communications interface 902 may include the device interface 610, and may include wired or wireless communications interfaces for communicating data between the device 608 and external systems or devices. While shown as single components, it will be appreciated that the device 608 may include one or more processing circuits including one or more processors and memory. In some embodiments, the device 608 includes a plurality of processors, memories, interfaces, and other components distributed across multiple devices or systems that are communicably coupled. As discussed above with regard to processor 706 and/or memory 708, processor 906 may include any suitable processing components configured to execute computer code or instructions stored in the memory 908, and memory 908 may include one or more devices for storing data and/or computer code for completing and/or facilitating the various processes described herein.

As shown in FIG. 9, the device 608 (e.g., the device access module 910) includes a device module 920, a security key module 924, an access code validator 928, an access code decryption module 932, an access level functions module 936, a device access database 940, and an access status generator 944. As discussed above, the device access module 910 (e.g., components 920-944) is configured to process and store device data, and may communicate device data to external systems or devices (e.g., via the device interface 610). In an exemplary embodiment, the device access module 910 (e.g., components 920-944) receives a security key, which is used to decrypt an encrypted access code so as to allow a user to access a set of functions of the device 608. The device access module 910 (e.g., components 920-944) may also provide access status indications, for example to a user of the device 608.

In an exemplary embodiment, the device module 920 is configured to process and store device data. As discussed above, device data may include a unique device identity code of the device 608 (e.g., an alphanumeric code, a serial number, etc.), characteristics of the device 608 (e.g., year, make, model, device configuration, component parts, component part configuration, etc.), characteristics a component or part of the device (e.g., motor, condenser, pump, heat exchanger, software, security key, etc.), and/or other suitable data relating to the device 608 (e.g., historic data on device use, maintenance, etc.), or any combination thereof. According to an exemplary embodiment, the device module 920 is also configured to communicate device data to components of the device 608. For example, the device module 920 may communicate the device identity code to the device interface 610, and the device interface 610 may display the code (e.g., as a QR code, alphanumeric code, etc.) to an external device or system. As discussed above, a user may obtain the device identity code (e.g., scan or input the code via the user interface 606), such that the user may identify the device 608 using the device identity code. In other embodiments, the device module 920 is configured to communicate device data (e.g., device identity code, device characteristics, etc.) to an external device or system via another suitable communications process.

In an exemplary embodiment, the security key module 924 is configured to receive, process, and store a security key. The security key may include access and/or security data files, and may be part of an encryption system configured to ensure secure and appropriate access to functions of the device 608 by an entity or user. According to an exemplary embodiment, the security key is installed in the device 608 during manufacturing (e.g., via data files on a circuit board, microchip, etc.), and the security key module 924 receives, processes, and/or stores the security key upon commissioning of the device 608. In some embodiments, the security key is installed on a memory device (e.g., circuit board, microchip), which may be installed in the device 608 to replace a second memory device, and the security key module 924 receives, processes, and stores the security key upon a software upgrade or update to the device 608. In some embodiments, the security key is transported to the device 608 via a memory device (e.g., a portable data storage device, etc.), for example by a technician, service representative, etc., and installed in the device 608 to replace a second memory device, as discussed above. In other embodiments, another device or system (e.g., the access manager platform 602, the storage system 614, etc.) generates a private key including the access and/or security data files (e.g., of the security key), which is downloaded to a memory device (e.g., a SD card, SIM card, a USB drive, etc.) and installed on the device 608. The security key module 924 may receive, process, and/or store the security key upon installation of the memory device, initiation of a security (e.g., encryption) system, completion of a software upgrade or update, and/or any other suitable action configured to establish the encryption system in the device 608. In this regard, the security key module 924 may receive, process, and store the security key upon manufacturing and/or commissioning, replacement of a memory device and/or a software update, and/or installation of a new memory device and completion of an initiation or upgrade process.

In some embodiments, after the security key module 924 receives, processes, and stores the security key, the access code validator 928 is configured to receive and/or process an encrypted access code. In an exemplary embodiment, the access code validator 928 (e.g., the device 608) is configured to receive the encrypted access code when the device 608 is not connected to (e.g., disconnected from) a communications protocol or network (e.g., direct connection via wired communications, wireless communications, a WAN, the Internet, a cellular network, etc.), for example via input from a user interacting with the device interface 610. In other embodiments, the access code validator 928 (e.g., the device 608) is configured to receive the encrypted access code when the device is connected to a direct or indirect communications network (e.g., a WAN, the Internet, a cellular network, etc.), for example via Bluetooth or RFID communications. In this regard, it should be understood that the device module 920 (e.g., the device 608) may be configured to receive an encrypted access code when the device 608 is disconnected from any communications protocol and/or a network (e.g., the Internet, a cellular network), as well as when the device module 920 (e.g., the device 608) is connected to a communications protocol and/or a network.

It is contemplated that the encrypted access code can be provided from the user device 604 to the device of building equipment 608 in a variety of ways. For example, in one embodiment, a user can read the encrypted access code (e.g., an alphanumeric string) via the user interface 606 of the user device 604 and manually enter the encrypted access code into the device interface 610 of the device of building equipment 608 (e.g., by typing the encrypted access code into a keypad or touchscreen of the device interface 610). In another embodiment, the device of building equipment 608 can scan or read the encrypted access code (e.g., a bar code, a QR code, RFID data, an alphanumeric string, etc.) from the user device 604 via an optical reader (e.g., a camera reading an optical display presented on the user interface 606 of the user device 604, a printout of the encrypted access code, etc.) or other reader (e.g., RFID reader) installed in the device of building equipment 608 or connected to the device of building equipment 608. In another embodiment, the user device 604 can electronically transmit the encrypted access code to the device of building equipment 608 via an electronic communication channel (e.g., Bluetooth, a Wi-Fi connection, a cable physically connecting the user device 604 and the device of building equipment 608, etc.) between the user device 604 and the device of building equipment 608. The electronic communication channel may be a direct connection between the user device 604 and the device of building equipment 608 or may be indirect via one or more intermediaries such as networking components of a local network (e.g., a LAN) for the building in which the device of building equipment 608 is installed (e.g., a router, network switch, etc.). Advantageously, the device of building equipment 608 can receive the encrypted access code via these or other means without requiring the device of building equipment 608 to have a network connection to an outside network (e.g., the internet, a cellular network, network 612, etc.), which allows the device of building equipment 608 to be disconnected or offline while still enabling the systems and methods described herein. However, it is contemplated that the device of building equipment 608 could be connected or online in some embodiments, as the systems and methods of the present disclosure can still operate regardless of whether the device of building equipment 608 is connected to an outside network. Throughout the present disclosure, references to "entering" the encrypted access code via the device interface 610 of the device of building equipment 608 (or similar language such as "transmitting," "providing," "inputting," etc.) should be understood to encompass any of the various ways that the encrypted access code can be communicated from the user device 604 to the device of building equipment 608.

In an exemplary embodiment, the access code includes security protocols in the form of security data, for example access code start times and/or lockouts, password lockouts, incorrect password access delays, access warning indicators, automatic and/or manual lockdowns or timeouts, etc. The access code validator 928 may receive the access code, validate the access code relative to the security data received from the access code, and/or determine whether access to the device 608 is granted or denied. In an exemplary embodiment, the access code validator 928 is configured to determine whether the access code is valid (e.g., determine whether the decrypted access code is compatible with the security and/or access protocols of the security key, security data, etc.), and/or authentic (e.g., determine whether the access code is associated, signed, etc. by an appropriate entity). If the access code validator 928 determines the access code is valid and authentic when evaluated according to the security protocols in the security data, the access code validator 928 may grant a user access to the device 608. However, if the access code validator 928 determines the access code is invalid or not authentic compared to the security protocols in the security data, the access code validator 928 may deny the user access to the device 608 and/or communicate a warning, fault, and/or error (e.g., to the access status generator 944). In other embodiments, the access code validator 928 is configured to receive and/or store a set of security protocol data (e.g., input from a user via the device interface 610, received from the storage system 614, etc.), for example access code start times and/or lockouts, password lockouts, etc. The access code validator 928 may receive the decrypted access code, validate the access code relative to the set of security protocol data, and/or determine whether access to the device 608 is granted or denied, as discussed above.

In an exemplary embodiment, once access is granted to the device 608 via the encrypted access code, the access code decryption module 932 is configured to receive and process an encrypted access code. As discussed above, the encrypted access code may be generated by the access manager platform 602 and/or communicated to the user device 604. In other embodiments, the encrypted access code is generated by, and/or is communicated to, another suitable device or system (e.g., the storage system 614, etc.). In an exemplary embodiment, the access code decryption module 932 receives the encrypted access code via input from a user interacting with the device interface 610 (e.g., input an alphanumeric code), communication between the user device 604 and the device 608 (e.g., the user interface 606 and the device interface 610, Bluetooth, RFID, etc. communication, etc.), and/or any other suitable communications protocol. In this regard, in some embodiments the access code decryption module 932 (e.g., the device 608) is configured to receive the encrypted access code when the device 608 is not connected to (e.g., disconnected from) a communications protocol or network (e.g., direct connection via wired communications, wireless communications, a WAN, the Internet, a cellular network, etc.), for example via input from a user interacting with the device interface 610. In other embodiments, the access code decryption module 932 (e.g., the device 608) is configured to receive the encrypted access code when the device is connected to a direct or indirect communications network (e.g., a WAN, the Internet, a cellular network, etc.), for example via Bluetooth or RFID communications.

According to an exemplary embodiment, the access code decryption module 932 is also configured to decrypt the encrypted access code. The decrypted access code may include data relating to the device 608, an entity or user (e.g., the user device 604), and/or access level data (e.g., a set of functions accessible on the device 608), as discussed below. In an exemplary embodiment, decrypted access code data is stored and/or communicated to other components of the device access module 910, for example for additional processing.

In an exemplary embodiment, the access level functions module 936 is also configured to receive and process the decrypted access code data. In an exemplary embodiment, the decrypted access code includes an entity access level, a user access level, entity level access restrictions, user restrictions, username and/or password lockouts, etc. Further, the decrypted access code may include access level faults, fault thresholds, warning indicators, and/or any other suitable safety data relating to a device, entity or user, and/or access level. According to an exemplary embodiment, the access level functions module 936 receives decrypted access code data, determines a set of functions of the device 608 that are accessible to the user based on the decrypted access code, and permits access to the set of functions of the device 608 to the user. In some embodiments, the decrypted access code also includes security data, for example access level start time and/or timeout restrictions, access level activity monitor and/or inactivity timeout restrictions, access level request and/or component modification restrictions, etc. In this regard, the access level functions module 936 may evaluate functions of the device 608 employed by the user, determine whether the functions are permissible compared to the security data, and in some instances activate an automated action in response to the determination (e.g., deny access before a start time, automatically logout after a predetermined period of time, deny access to an impermissible modification request, etc.).

In an exemplary embodiment, the device access database 940 is configured to receive data from components of the device access module 910, and store the data (e.g., in the form of access logs). For example, the device access database 940 may be configured to receive and store data each time a login is attempted (e.g., an encrypted access code is received by the access code decryption module 932) and/or a logout is attempted (e.g., a user manually logs out, an automatic log out is actuated by the access level functions module 936, etc.). According to an exemplary embodiment, each time a login is attempted, the device access database 940 receives and stores data relating to date, time, entity identification (e.g., entity level username, username and password, etc.), access level (e.g., access level, access level restrictions, etc.), login status (e.g., valid access, access denied, maximum incorrect attempts, etc.). The device access database 940 may also receive and store additional data, for example duration of use of the device 608, functions executed using the device 608, function modification attempts, etc. According to an exemplary embodiment, each time a logout is attempted or actuated, the device access database 940 receives and stores data relating to a date, time, entity identification, access level, logout status (e.g., inactivity actuated logout, access timeout logout, user logout, etc.). The device access database 940 may receive, store, and/or process the login and/or logout data in access log data files, which may be processed, reviewed, and/or communicated to external devices or systems (e.g., via the device interface 610). In this regard, the device 608 (e.g., the device access database 940) may monitor and store login, logout, and use data relating to the device 608, so as to ensure appropriate and timely access to device functions to improve safety and efficiency.

In an exemplary embodiment, the access status generator 944 is configured to receive data from components of the device access module 910, and/or provide an indication relating to the functions and status of the device. For example, the access status generator 944 may receive an error, warning, and/or fault from the access code decryption module 932, for example in response to an invalid login attempt (e.g. maximum attempts, login timeout, etc.). In response, the access status generator 944 may provide an error message indicating an invalid login attempt, a warning of an automatic restart, etc. (e.g., via the device interface 610). In some embodiments, the access status generator 944 receives an error, warning, and/or fault from the access level functions module 936, for example in response to an invalid function request or access level restriction fault. In response, the access status generator 944 may provide a warning of an automatic restart, generate an automated action to control the device 608 to return to appropriate function settings, etc.

Flow Diagram

Figure 10:
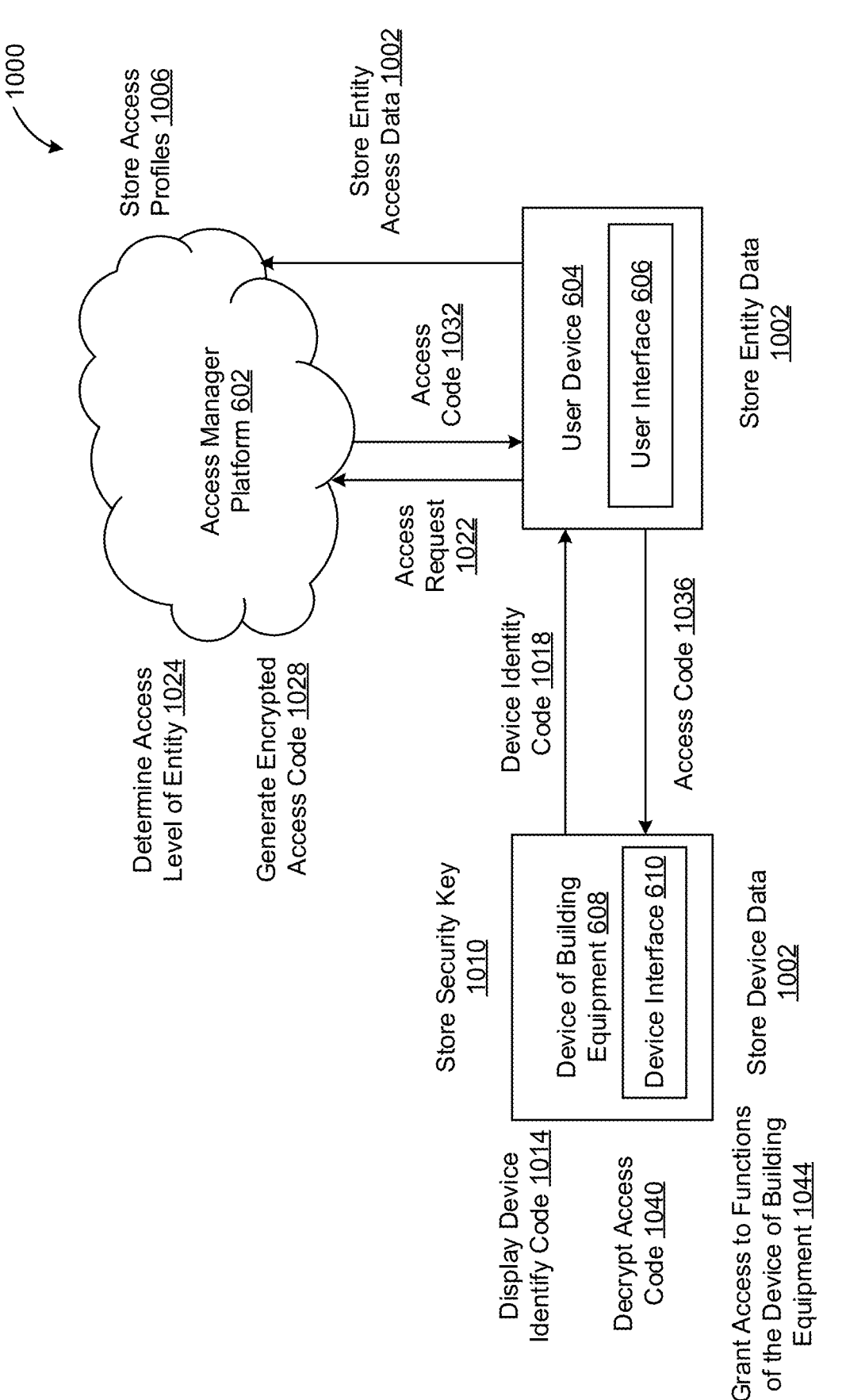
FIG. 10 is a flow diagram for accessing a device of building equipment using components of the access management system of FIG. 6, according to some embodiments.

Referring now to FIG. 10, a diagram illustrating a process 1000 of accessing a device of building equipment using an encrypted access code is shown, according to an exemplary embodiment. FIGS. 11-19 provide exemplary interfaces (e.g., user interface 606, device interface 610, etc.) illustrating steps of the processes described in FIG. 10. In an exemplary embodiment, the access manager platform 602 receives and stores entity access data, the user device 604 receives and stores entity data, and the device 608 receives and stores device data. The device 608 may further receive and store a security key. According to an exemplary embodiment, the user device 604 obtains device data via the device 608 (e.g., the device interface 610), and communicates an access request to the access manager platform 602, the request including a device identity code and entity data. The access manager platform 602 may receive the access request, process the request, and communicate an encrypted access code to the user device 604. In an exemplary embodiment, a user (e.g., via the user device 604) provides the encrypted access code to the device 608, the device 608 receives and decrypts the encrypted access code using the security key, and permits access to a predetermined set of functions of the device based on the access code.

At step 1002, the user device 604 stores entity data, the device 608 stores device data, and the access manager platform 602 stores entity access data, according to an exemplary embodiment. As discussed above, entity data includes entity or user identification information, passwords, access levels, etc.; device data includes a unique device identity code, device characteristics, device component characteristics, etc.; and entity access data includes device data, entity data, access level data (e.g., number of access levels, device functions of each access level, etc.), and/or security data (e.g., access code start times and/or lockouts, incorrect password delays, etc.). In an exemplary embodiment, the user device 604 receives and stores entity access data via input from a user accessing the user interface 606. As shown in the exemplary embodiment of FIG. 11, a user provides entity data (e.g., an entity level email, password, etc.) via the user interface 606. In an exemplary embodiment, the device 608 receives and stores device data (e.g., unique device identity code, etc.) upon commissioning of the device 608, as the device 608 is used, and/or when the device 608 receives software updates or upgrades. According to an exemplary embodiment, the access manager platform 602 receives and stores entity access data from the user device 604, for example via input from a user accessing the user interface 606. In other embodiments, the access manager platform 602 receives and stores entity access data from another suitable device or system (e.g., the storage system 614, etc.).

At step 1006, the access manager platform 602 stores a plurality of access profiles, according to an exemplary embodiment. As discussed above, the access profiles combine device data, entity data, and/or access level data, and represent an access level (or levels) available on a device (or devices) to a specific entity and/or user. According to an exemplary embodiment, components of the access manager platform 602 receive entity access data, process the data, and generate (and store) a plurality of access profiles. For example, the access manager platform 602 may generate a first access profile that allows a user with entity level identification to view and navigate the device interface 610 of the device 608, a second access profile that allows a user with entity level identification and a password to modify setpoints to operate the device 608, a third access profile that allows a user with a specified username and password to modify standard operating features of the device 608, etc. In other embodiments, the access manager platform 602 receives a plurality of access profiles from the user device 604, for example via input from a user accessing the user interface 606, and stores the plurality of access profiles. In yet other embodiments, the access manager platform 602 receives a plurality of access profiles from another suitable device or system (e.g., the storage system 614, etc.).

At step 1010, the device 608 stores a security key, according to an exemplary embodiment. In an exemplary embodiment, the security key is installed in the device 608 during manufacturing, and stored in the device 608 upon commissioning. In some embodiments, the security key is downloaded to a memory device, the device 608 receives the memory device (e.g., to replace another memory device), and the device 608 stores the security key upon a software upgrade or update. In other embodiments, another device (e.g., the access manager platform 602, etc.) generates a private key that is downloaded to a memory device, the memory device is installed in the device 608, and the device 608 stores the security key upon installation of the memory device, installation of a security and/or encryption software, completion of a software upgrade or update, and/or any other suitable action configured to establish an encryption system in the device 608. In this regard, and as discussed above, the device 608 may store the security key upon manufacturing and/or commissioning, installment of a memory device having the security key (e.g., replacement, repair, etc.) and/or a software update, and/or installation of a new memory device and completion of an initiation or upgrade process.

At step 1014, the device 608 provides a device identity code, according to an exemplary embodiment. In an exemplary embodiment, the device 608 displays the device identity code on the device interface 610. As shown in the exemplary embodiment of FIG. 12, the device identity code is displayed on the device interface 610 as a QR code. In other embodiments, the device identity code is displayed and/or communicated as another suitable code (e.g., an alphanumeric code, etc.). At step 1014, the device 608 (and/or the device interface 610) may provide additional device data, for example a device identity code, a characteristic of the device (e.g., make, model, year, etc.), a characteristic of a component of the device (e.g., motor, heater, condenser, etc.), and/or a combination thereof.

At step 1018, the user device 604 receives the device identity code of the device 608, according to an exemplary embodiment. As shown in the exemplary embodiment of FIG. 13, the user device 604 receives the device identity code by scanning the QR code on the device interface 610. In other embodiments, the user device 604 receives the device identity code via input from a user accessing the user interface 606 (e.g., an alphanumeric code). In yet other embodiments, the user device 604 receives the device identity code via another communication protocol between the user device 604 and the device 608 (e.g., RFID tag, etc.).

Figure 11:
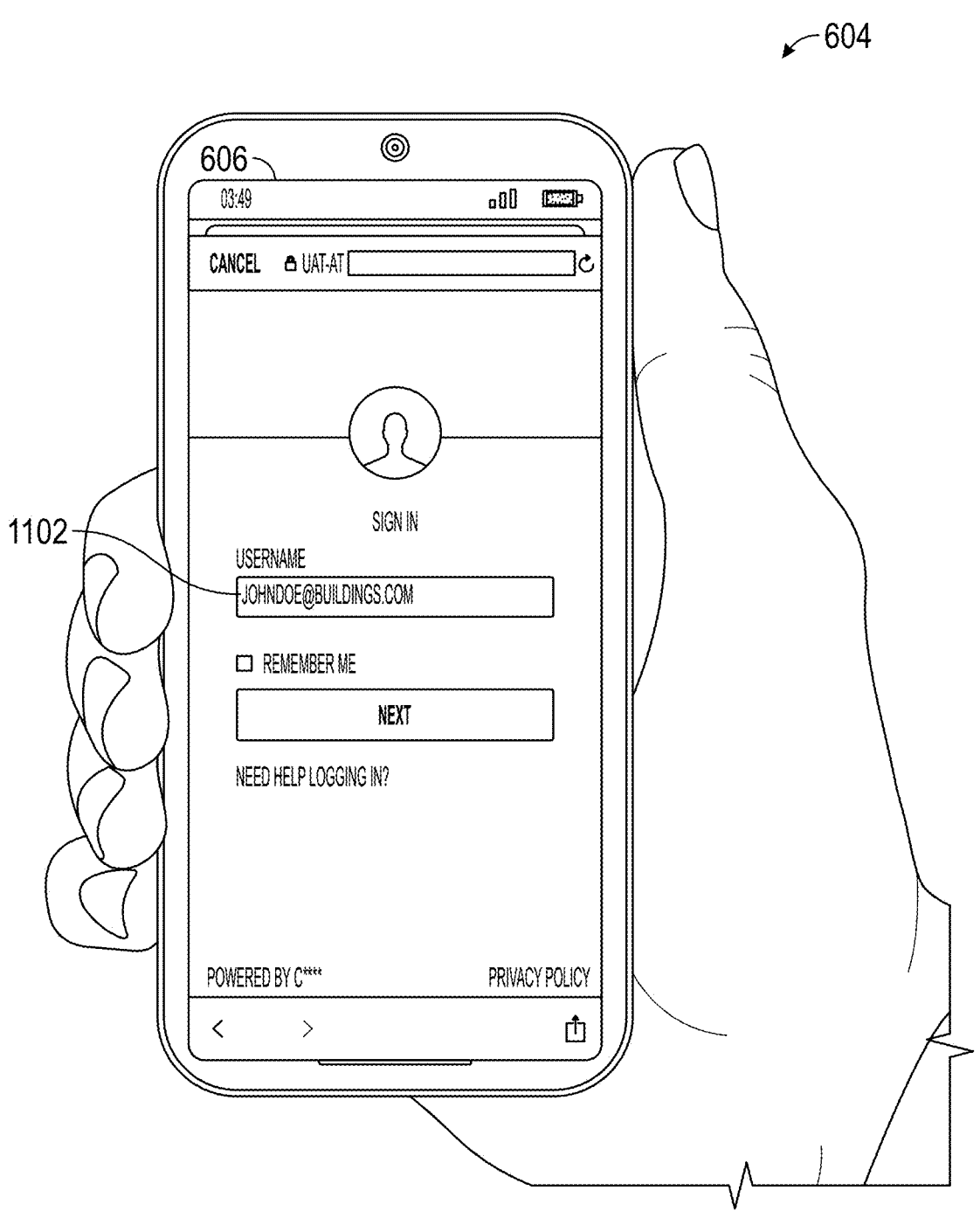
FIG. 11 is a user device interface of the user device of FIG. 8 having a login interface, according to some embodiments.

At step 1022, the user device 604 communicates an access request to the access manager platform 602, according to an exemplary embodiment. As discussed above, the user device 604 stores entity data (e.g., at step 1002), which may include an entity level email and/or password input into the user device 604 (e.g., as shown in FIG. 11), a username and/or entity password, a user username and/or password, etc.

Further, the user device 604 receives and stores device data (e.g., at step 1018), which may include a unique device identity code of the device 608, a characteristic of the device 608, etc. According to an exemplary embodiment, the user device 604 generates an access request that includes entity data relating to the user of the user device 604 requesting access, and device data that identifies the device 608 to which access is requested. As shown in the exemplary embodiment of FIG. 14, a user generates an access request that includes the entity level email of the user of the user device 604 and the device identity code of the device 608 (e.g., a serial number) by interacting with the user interface 606. In some embodiments, a user generates an access request that includes additional information and/or data (e.g., entity data, device data, user preferences, etc.). As shown in the exemplary embodiment of FIG. 15, a user generates an access request that includes the entity level email of the user of the user device 604, the device identity code of the device 608 (e.g., a serial number), and a desired access start time. According to an exemplary embodiment, after the user device 604 generates the access request, the access request is communicated to the access manager platform 602.

At step 1024, the access manager platform 602 determines an access level of an entity or user based on an access request, according to an exemplary embodiment. As discussed above, the access manager platform 602 is configured to receive an access request from the user device 604 (e.g., at step 1022), compare the access request to a plurality of access profiles stored in the access manager platform 602 (e.g., at step 1006), and determine an access level of the entity or user requesting access to the device 608 based on the access request. For example, the access manager platform 602 may receive an access request that includes entity data (e.g., entity level email of the user of the user device 604) and device data (e.g., device identity code of the device 608), and compare the entity and device data of the access request to entity and device data of the plurality of profiles stored in the access manager platform 602. Based on the comparison, the access manager platform 602 determines an access level of the user of the user device 604 to the device 608. In some embodiments, based on the comparison the access manager platform 602 determines an access profile associated with the user of the user device 604 and the device 608, which includes an access level. According to an exemplary embodiment, the access manager platform 602 is also configured to process the entity data, device data, and determined access level (e.g., as access data), and/or the determined access profile, as discussed below.

At step 1028, the access manager platform 602 generates an encrypted access code, according to an exemplary embodiment. In an exemplary embodiment, the encrypted access code is generated using entity, device, and access level data, and represents an access level, of an entity or user, to a device or plurality of devices. For example, the access manager platform 602 may generate an encrypted access code that represents the user of the user device 604 has first level access (e.g., view access) to the device 608. In some embodiments, the encrypted access code is generated using additional information or data (e.g., security data) received and/or stored in the access manager platform 602. For example, the access manager platform 602 may generate an encrypted access code that represents the user of the user device 604 has third level access (e.g., enhanced access) to the device 608, beginning at a predetermined start time, and/or the encrypted access code permits access for a predetermined period of time (e.g., 10, 30, 45, etc. minutes, 1, 3, 5, 14, etc. days, etc.). In some embodiments, the encrypted access code includes additional security protocols relating to the user of the user device 604 and/or the device 608, for example incorrect password access delays (e.g., 5, 10, 30, 60, etc. seconds), password lockouts (e.g., maximum of 1, 3, 5, 10, etc. attempts, etc.), invalid access request indicators (e.g., invalid access code, expired access code, inactive access code, etc. indications), access warning indicators (e.g., automatic reset warning, etc.), automatic lockdowns or inactivity logout timeouts (e.g., 10, 15, 30, 60, etc. minutes, etc.), etc.

Figure 16:
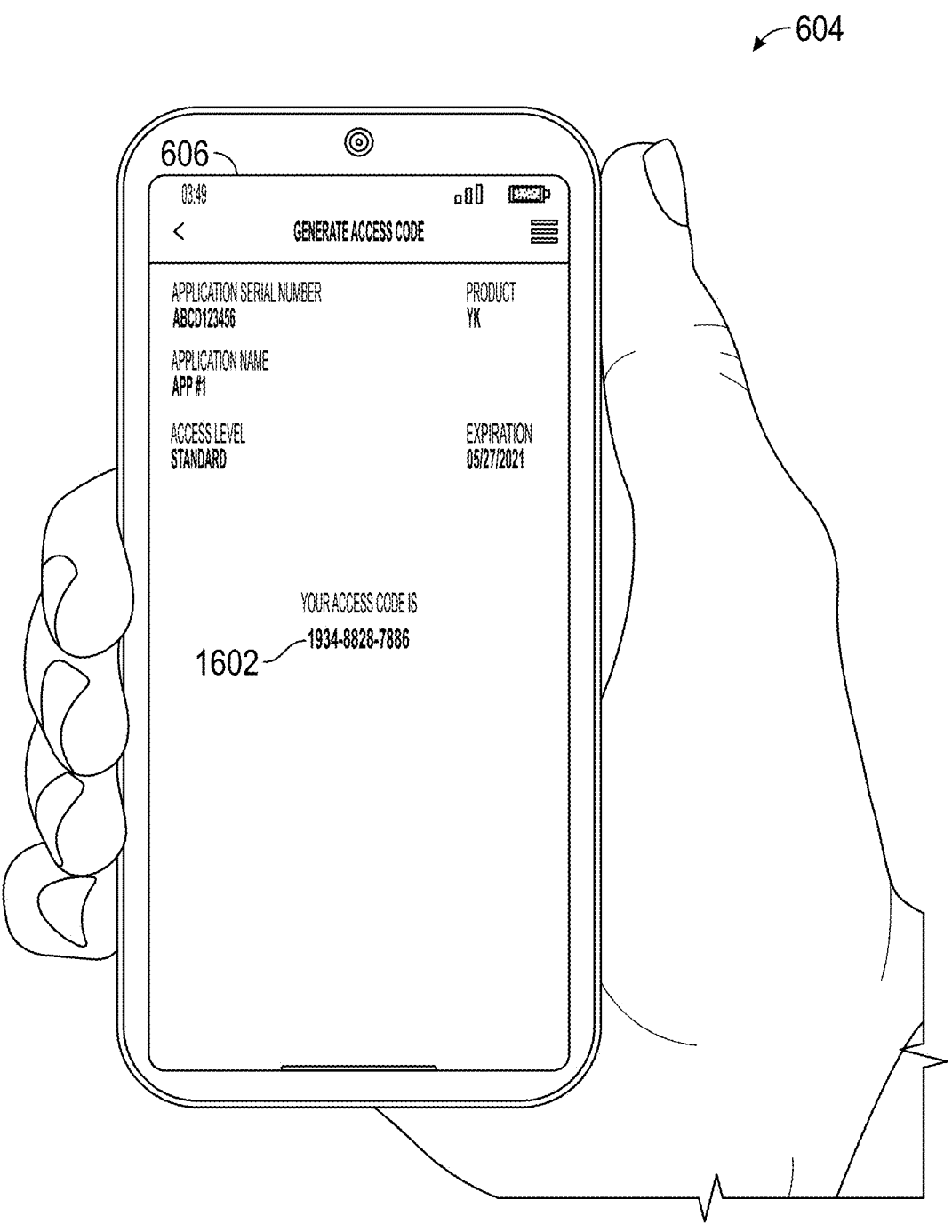
FIG. 16 is a user device interface of the user device of FIG. 8 having an access code interface, according to some embodiments.

At step 1032, the encrypted access code is received by the user device 604, according to an exemplary embodiment. Once the access manager platform 602 generates an encrypted access code, the access code may be communicated to, and received by, the user device 604. According to an exemplary embodiment, the user device 604 receives the encrypted access code when the user device 604 is disconnected from the internet and/or a network (e.g., via Bluetooth, etc.). In this regard, the encrypted access code may be communicated from the access manager platform 602, and received by the user device 604 under secure communications protocols. In other embodiments, the user device 604 receives the encrypted access code when the user device 604 is connected to a communications network (e.g., internet, WiFi, the network 612, etc.). As shown in the exemplary embodiment of FIG. 16, once the user device 604 receives the encrypted access code, the encrypted access code may be displayed to a user on the user interface 606 (e.g., as an alphanumeric code, etc.). As shown in FIG. 16, the encrypted access code may include and/or be displayed with additional information or data, for example the device identity code and/or device data (e.g., serial number, model, name), an access level of the user of the user device 604 (e.g., standard level access), an access level duration (e.g., expiration), etc.

At step 1036, the encrypted access code is received by the device 608, according to an exemplary embodiment. As discussed above, once the user device 604 receives the encrypted access code, the encrypted access code may be communicated to the device 608. According to an exemplary embodiment, the encrypted access code is received by the device 608 via the device interface 610. As shown in the exemplary embodiment of FIG. 17, the device 608 receives the encrypted access code via a user of the user device 604 interacting with the device interface 610, for example by entering the alphanumeric number representing the encrypted access code into the device interface 610. In other embodiments, the encrypted access code is received by the device 608 via another communication protocol between the user device 604 and/or user interface 606, and the device 608 and/or device interface 610 (e.g., Bluetooth, RFID, etc. communication). As discussed above, in some embodiments the device 608 and/or the encrypted access code includes validation and/or security protocols, which may be implemented when the encrypted access code is received by the device 608. For example, the device 608 (e.g., the device interface 610) may provide an incorrect password or access code warning, incorrect password or access delays, password or access lockouts, etc. As shown in the exemplary embodiment of FIG. 18, once the device 608 receives a valid and authentic encrypted access code, the device interface 610 provides a successful login indication to the user. In an exemplary embodiment, the device 608 is further configured to process and store data relating to the login attempt (e.g., receiving an access code). For example, upon receiving an access code (e.g., a login attempt), the device 608 may process and store data relating to a date, time, entity identification (e.g., entity level username, username and password, etc.), access level (e.g., access level, access level restrictions, etc.), login status (e.g., permissible access, access denied, maximum incorrect attempts, etc.). Further, once the device 608 is in use, the device 608 may also store the duration of use of the device 608, functions executed using the device 608, function modification attempts, and/or any other suitable data relating to the use of the device 608.

At step 1040, the device 608 decrypts the encrypted access code using the security key, according to an exemplary embodiment. As discussed above, the device 608 decrypts the encrypted access code using the security key, and receives and/or processes decrypted access code data to determine a set of functions of the device 608 accessible to the user of the user device 604. For example, the decrypted access code may include baseline functions of the device 608 (e.g., access level) accessible to the user, access level faults or restrictions of the device 608, function modification restrictions of the device 608, etc. In addition, the decrypted access code may include security protocols relating to the user of the user device 604 and/or the device 608, for example device access duration, inactivity timeout duration, access level request restrictions, etc. Based on the decrypted access code, the device 608 may the user of the user device 604 access to the determined set of functions of the device 608 (at step 1044).

User Interfaces

Referring generally to FIGS. 11-18, exemplary device interfaces used throughout the process described in FIG. 10 are shown, according to an exemplary embodiment. Referring first to FIG. 11, the user device 604 is shown to include user interface 606 having a login interface, according to an exemplary embodiment. The login interface is shown to include an entity login block 1102, in which a user of the user device 604 inputs entity data (e.g., an entity level email, password, username, password, etc.), so as to identify the entity or user of the user device 604. In some embodiments, the entity login block 1102 includes additional blocks, for example to allow an entity or user to create a new account.

Figure 12:
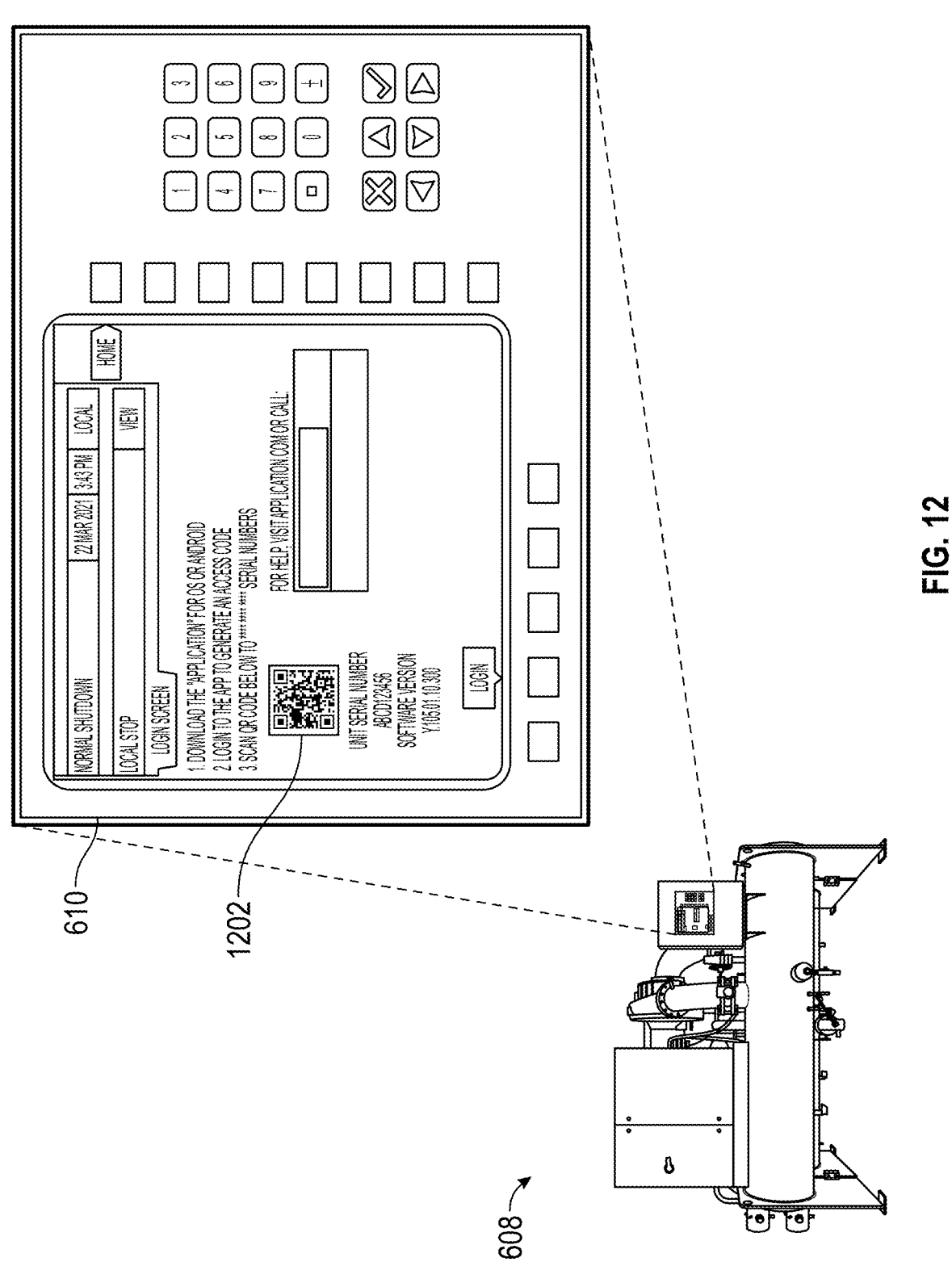
FIG. 12 is a device interface of the device of FIG. 9 having a device identification interface, according to some embodiments.

Referring now to FIG. 12, the device 608 is shown to include device interface 610 having a device identification interface, according to an exemplary embodiment. The device identification interface is shown to include a device identifier block 1202, which is configured to display device data of the device 608 so as to uniquely identify the device. In an exemplary embodiment, the device identifier block 1202 displays a device identity code of the device 608 in the form of a QR code; however, in other embodiments the device identifier block 1202 displays device data in another form (e.g., alphanumeric code).

Figure 13:
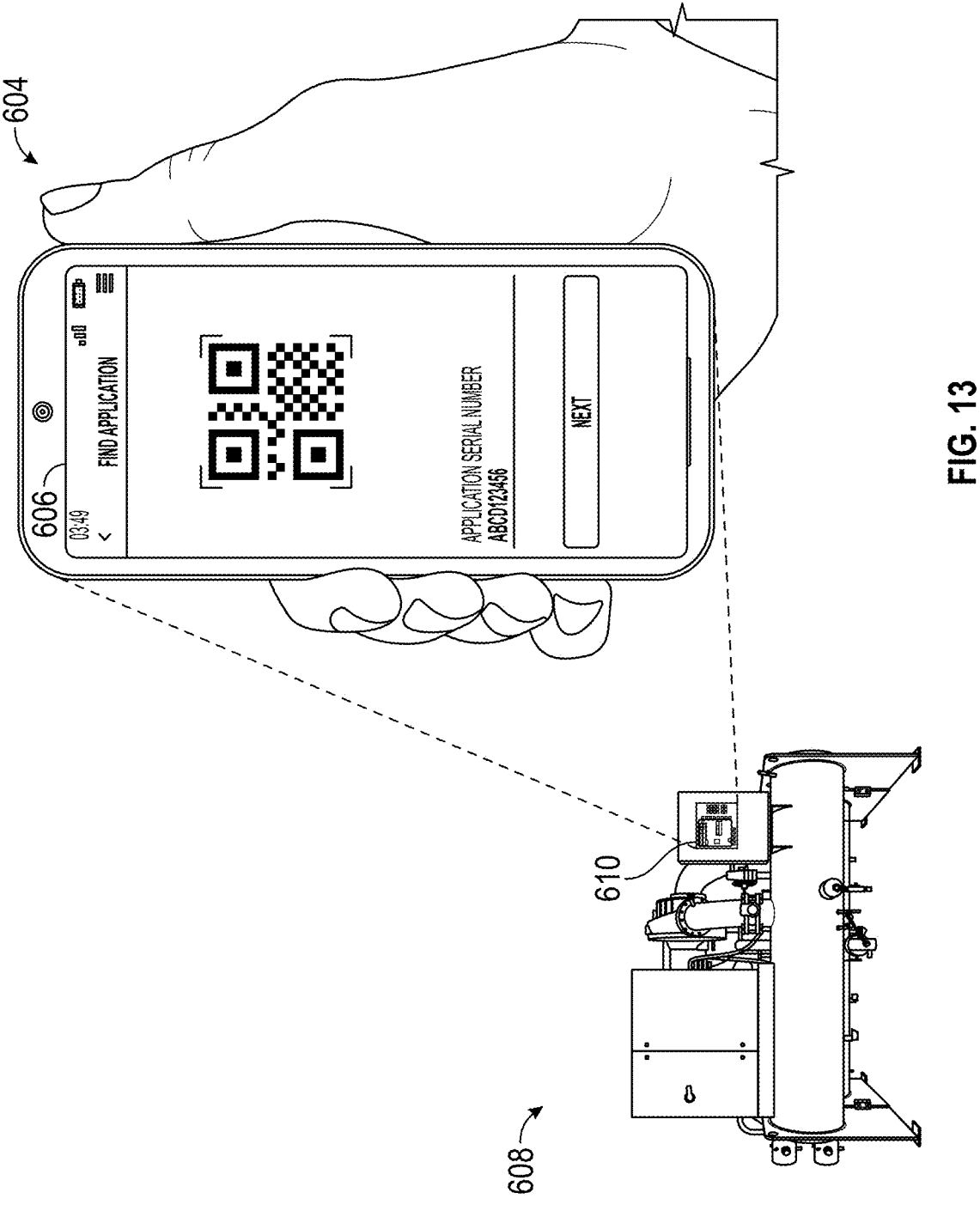
FIG. 13 is a user device interface of the user device of FIG. 8 having a device identification interface, according to some embodiments.

Referring now to FIG. 13, the user device 604 is shown to include user interface 606 having a device identification interface, according to an exemplary embodiment. The device identification interface is shown to include information obtained from the device identifier block 1202 of the device 608 of FIG. 12. According to an exemplary embodiment, components of the user device 604 (e.g., a camera, the user interface 606, etc.) are configured to obtain data from the device identifier block 1202 (e.g., scan, input, etc.), and display the information on the user interface 606. For example, the user device 604 (e.g., a camera, etc.) may scan the device identifier block 1202, such that the user device 604 receives the identity code of the device 608 and/or displays the device identity code on the user interface 606 as a QR code. In other embodiments, a user of the user device 604 observes the device identifier block 1202, and inputs the identity code of the device 608 displayed in the device identifier block 1202 into the user interface 606, for example as an alphanumeric code.

Figure 14:
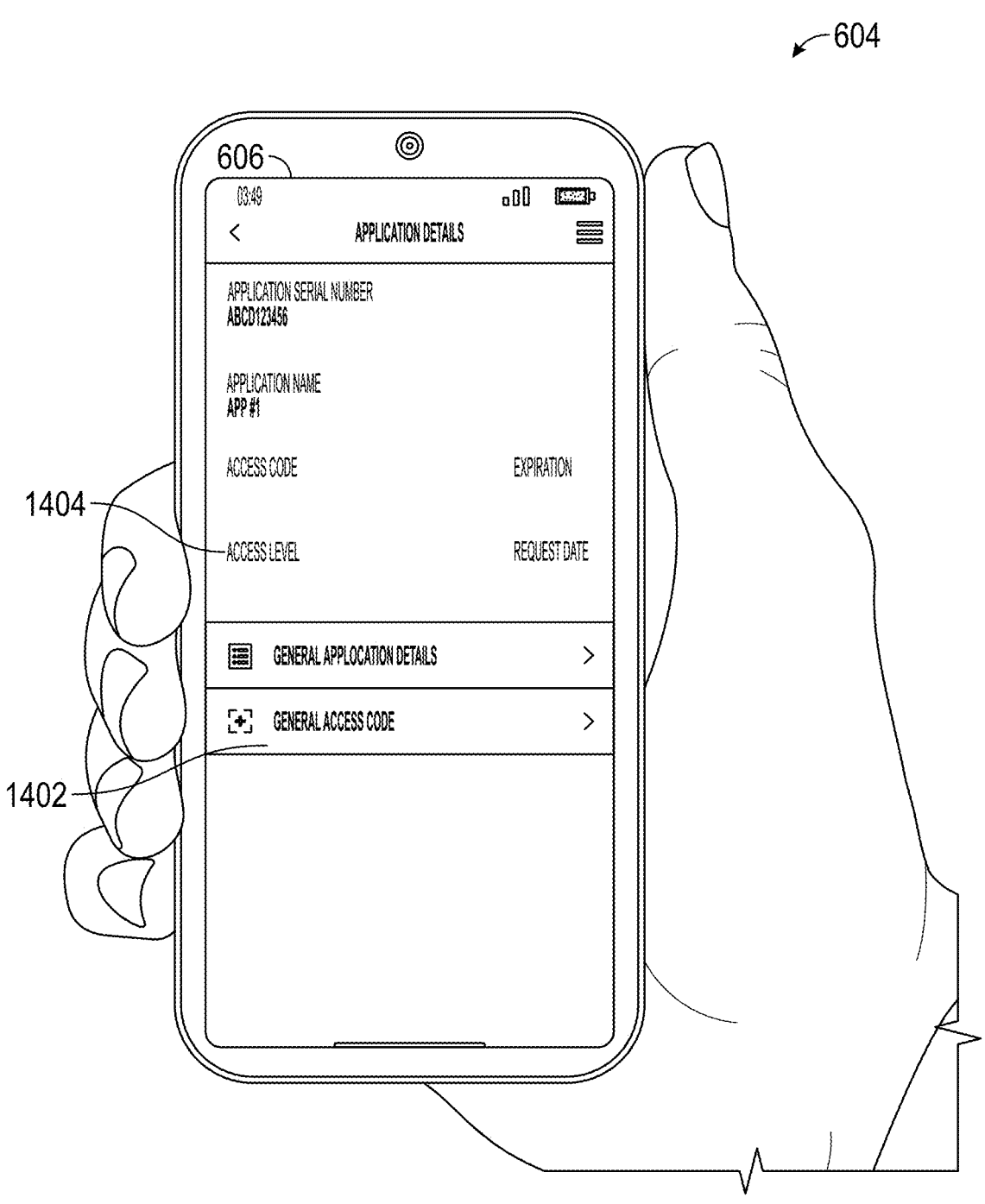
FIG. 14 is a user device interface of the user device of FIG. 8 having an access request interface, according to some embodiments.
Figure 15:
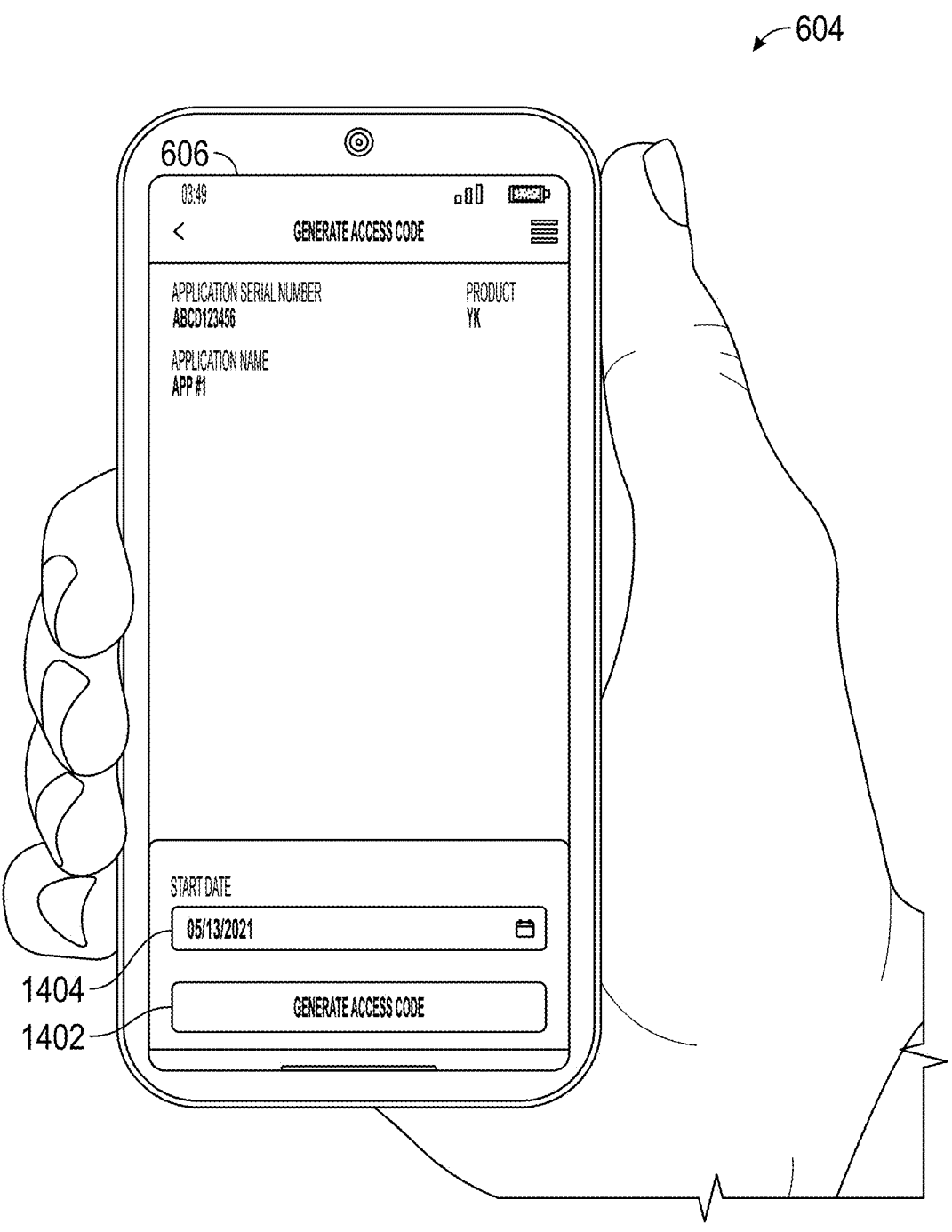
FIG. 15 is a user device interface of the user device of FIG. 8 having another access request interface, according to some embodiments.

Referring now to FIGS. 14-15, the user device 604 is shown to include user interface 606 having access request interfaces, according to an exemplary embodiment. The access request interfaces are shown to include an access request icon 1402, which may be manipulated by the user in order to generate an access request. According to an exemplary embodiment, the access request includes entity data (e.g., as shown in FIG. 11), device data (e.g., as shown in FIG. 13), and/or any other suitable data desired by the user requesting access. As shown in FIGS. 14-15, the access request interface may include access request parameter blocks 1404. The access request parameter blocks 1404 may be used to enter additional request parameters, for example, an access code duration (as shown in FIG. 14), an access level (as shown in FIG. 14), a desired access code start date (as shown in FIG. 15), etc.

Referring now to FIG. 16, the user device 604 is shown to include user interface 606 having an access code interface, according to an exemplary embodiment. The access code interface is shown to include an access code block 1602, which is configured to display an encrypted access code that may be used to access functions of the device 608. In an exemplary embodiment, the user device 604 receives and encrypted access code based on the access request (e.g., via the access manager platform 602), and the access code block 1602 displays the encrypted access code in the form of a 12 digit alphanumeric code. In other embodiments, the access code block displays the encrypted access code in another form (e.g., a QR code, etc.) and/or of another length (e.g., 3, 5, 10, etc. digits).

Figure 17:
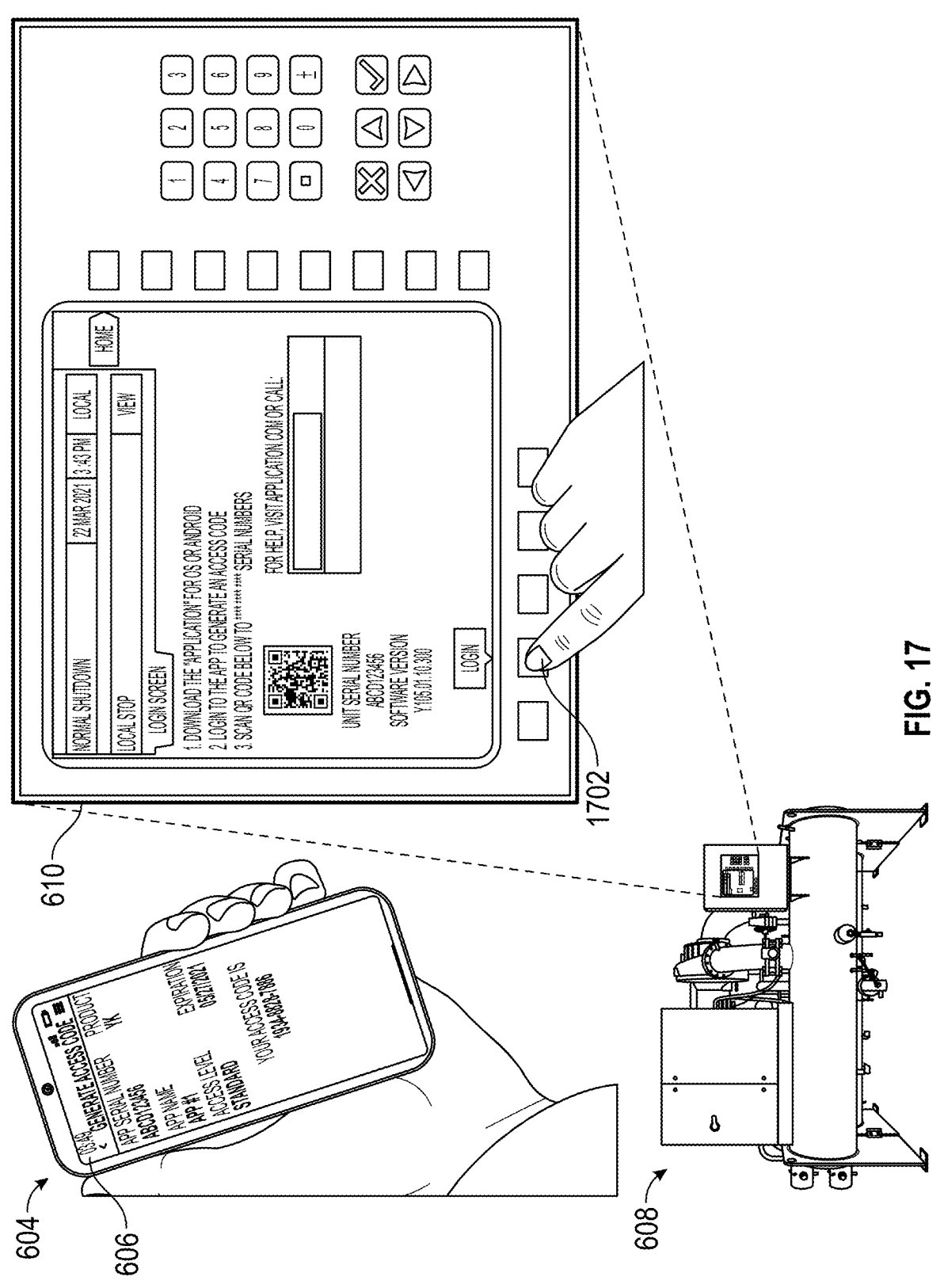
FIG. 17 is a device interface of the device of FIG. 9 having a login interface, according to some embodiments.
Figure 18:
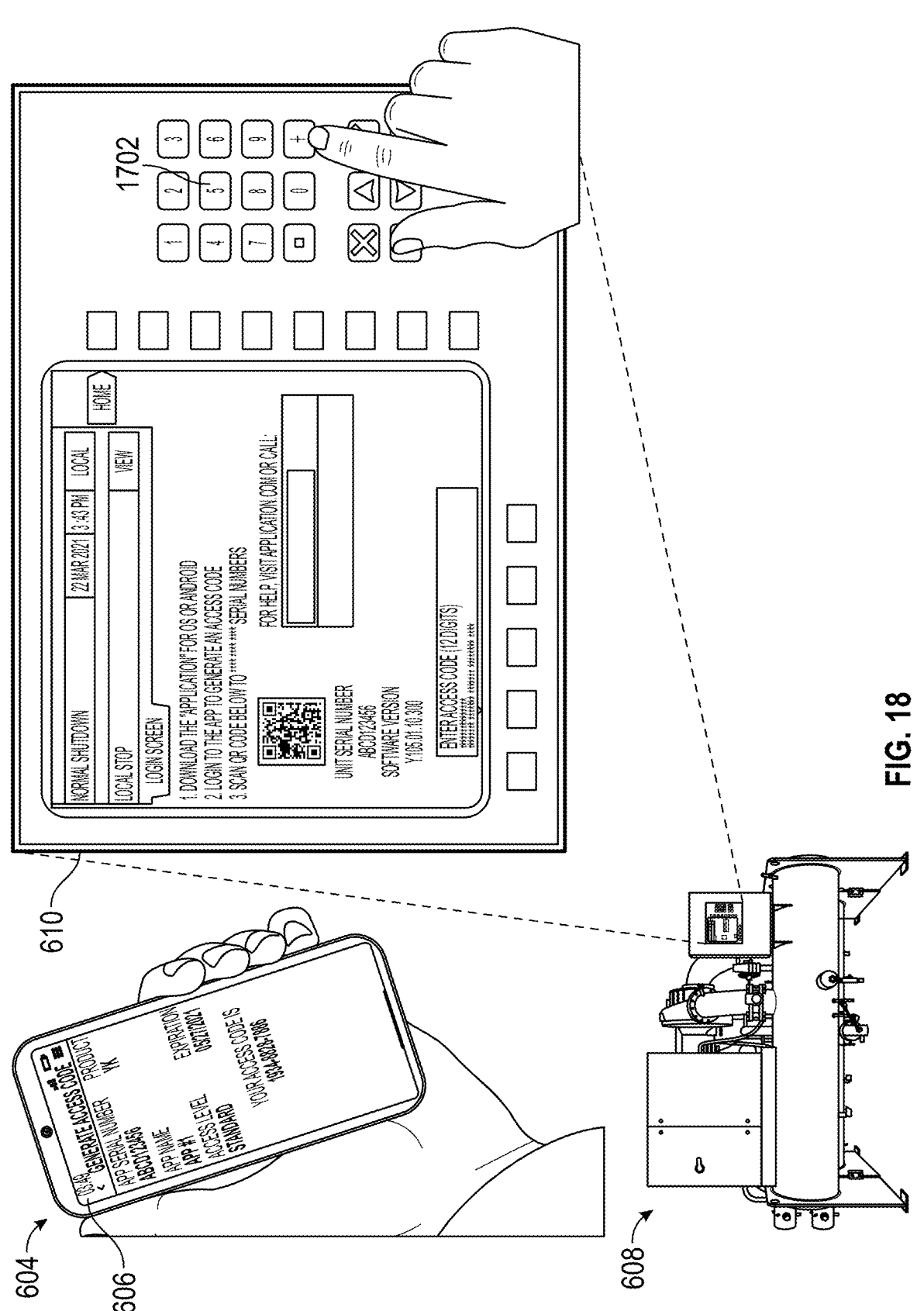
FIG. 18 is a device interface of the device of FIG. 9 having another login interface, according to some embodiments.

Referring now to FIGS. 17-18, the device 608 is shown to include device interface 610 having a login interface, according to an exemplary embodiment. The login interface is shown to include a device login icon 1702 (as shown in FIG. 17), which a user may manipulate in order to begin a device access (e.g., login) process. After a user manipulates the device login icon 1702, the login interface is shown to include an access code block 1802 (as shown in FIG. 18), in which a user of the user device 604 inputs the encrypted access code (e.g., via the user interface 606 of the user device 604). According to an exemplary embodiment, if the user inputs an acceptable access code, the login interface indicates the user is granted access to a set of functions of the device 608.

Access Management Processes

Referring now to FIG. 19, a process 1900 for providing access to a device of building equipment using an encrypted access code is shown, according to an exemplary embodiment. Process 1900 may be implemented by any and/or all of the components of the access management system 600 of FIGS. 6-9 (e.g., via the access manager platform 602). Process 1900 may also be implemented using the components of FIGS. 1-5. It should be appreciated that all or part of the process 1900 may be implemented by other systems, devices, or components (e.g., components of the access management system 600, of the access manager platform 602, etc.). It should also be appreciated that in some embodiments process 1900 may be implemented using additional, different, and/or fewer steps.

Process 1900 is shown to include receiving an access request for a device of building equipment (step 1902), according to an exemplary embodiment. The access request may be received from a user device (e.g., the user device 604), and/or another suitable device or system (e.g., the storage system 614). According to an exemplary embodiment, the access request includes entity data and device data, and identifies an entity requesting access to a device (e.g., a user of the user device 604) and the device to which access is requested (e.g., the device 608). As discussed above, entity data may be provided to the user device 604 via input from a user accessing the user interface 606, and may include entity identification information, user identification information, temporary user identification information, and/or any other suitable data. Device data may be provided to the user device 604 via communication between the user device 604 and the device 608 (e.g. the user device 604 scanning a code or display on the device interface 610), and may include a unique device identity code, a device characteristic, a characteristic of a component of a device, and/or any combination thereof.

Process 1900 is shown to also include determining an access level of an entity based on the access request (step 1904), according to an exemplary embodiment. In an exemplary embodiment, the access level of an entity is determined by comparing the access request to a plurality of access profiles stored in a database (e.g., access profile database 732 of the access manager platform 602). In an exemplary embodiment, the plurality of access profiles are generated and stored by the access manager platform 602 based on entity access data received from a device or system (e.g., the user device 604); however in other embodiments the plurality of access profiles are received and stored (e.g., by the access manager platform) from a device or system (e.g., the user device 604). An access profile may include, for example a combination of entity data, device data, and access level data, and may indicate an access level of an entity or user (e.g., a user of the user device 604) to a device or plurality of devices (e.g., the device 608). The access level may indicate, for example a set of functions of the device 608 or a plurality of devices (e.g., view, modify setpoints, modify components, repair/replace components, etc.) available to an entity or user (e.g., the user of the user device 604). According to an exemplary embodiment, the access request (e.g., entity data, device data, etc.) is compared to the plurality of access profiles (e.g., entity data, device data, etc. of each of the plurality of access profiles), and based on the comparison an access level of the entity to the device is determined. For example, an access request may be compared to the plurality of access profiles, and it may be determined that a user of the user device 604 with an entity level email has first level access (e.g., view access) to the device 608.

Process 1900 is shown to include generating an encrypted access code (step 1906), according to an exemplary embodiment. In an exemplary embodiment, the encrypted access code is generated using entity data, device data, and access level data (e.g., determined at step 1904), and represents an access level of an entity or user to a device or plurality of devices. For example, based on an access request and a determined access level (and/or an access profile), an encrypted access code may be generated that allows the user of the user device 604 first level access (e.g., view access) to the device 608. In some embodiments, the encrypted access code includes additional information or data, for example security protocols configured to ensure appropriate access of the user of the user device 604 to the device 608 (e.g., password lockouts, password access delays, invalid access request indicators, access warnings, automatic lockouts or timeouts, etc.).

Process 1900 is also shown to include transmitting the encrypted access code to the user device to grant access to the device of building equipment when the code is entered. According to an exemplary embodiment, the encrypted access code is communicated (e.g., from the access manager platform 602) to the user device 604 when the user device 604 is disconnected from the internet and/or a network (e.g., via Bluetooth). The user device 604 may receive the encrypted access code, and display the access code on the user interface 606 (e.g., as an alphanumeric code, etc.). According to an exemplary embodiment, the device 608 is configured to receive the encrypted access code, validate or process the access code, and/or decrypt the access code using a security key in the device 608. The device 608 may receive the encrypted access code via the device interface 610, for example via a user inputting the encrypted access code (e.g., alphanumeric code) to the device interface 610. The device 608 may validate and/or process the encrypted access code, and determine whether access to the device 608 is granted or denied, as discussed above. In an exemplary embodiment, if access is granted, the device 608 is configured to determine a set of functions accessible to the user of the user device 604 (e.g., based on the decrypted access code), and grant access to user of the user device 604 to the determined set of functions of the device 608.

Referring now to FIG. 20, a process 2000 for allowing access to a set of functions of a device of building equipment based an encrypted access code is shown, according to an exemplary embodiment. Process 200 may be implemented by any and/or all of the components of the access management system 600 of FIGS. 6-9 (e.g., via the device 608). Process 2000 may also be implemented using the components of FIGS. 1-5. It should be appreciated that all or part of the process 200 may be implemented by other systems, devices, or components (e.g., components of the access management system 600, etc.). It should also be appreciated that in some embodiments process 1900 may be implemented using additional, different, and/or fewer steps.

Process 2000 is shown to include storing a security key for a device of building equipment (step 2002), according to an exemplary embodiment. As discussed above, in an exemplary embodiment the security key includes access and/or security files, and may be part of an encryption system configured to ensure secure and appropriate access to functions of a device (e.g., the device 608) by an entity or user (e.g., a user of the user device 604). According to an exemplary embodiment, the security key is installed in the device 608 during manufacturing, and/or stored in the device 608 upon commissioning of the device. In some embodiments, the security key is installed on a memory device, the memory device is installed in the device 608 (e.g., to replace an existing memory device), and the security key is stored in the device 608 upon software upgrade or update to the device 608. In other embodiments, another device or system (e.g., the access manager platform) generates a private key including access and/or security files (e.g., of the security key), and the private key is installed on a memory device. The memory device may be installed in the device 608, and the security key may be stored in the device upon installation of the memory device, initiation of a security (e.g., encryption) system, completion of a software upgrade or update, and/or any other suitable action configured to establish the encryption system in the device 608.

Process 2000 is also shown to include receiving an encrypted access code (step 2004), according to an exemplary embodiment. In an exemplary embodiment, the device 608 receives the encrypted access code via the device interface 610. As discussed above, the encrypted access code may be generated by a device or system (e.g., the access manager platform 602, etc.), and/or communicated to another device or system (e.g., the user device 604, user interface 606, etc.) prior to being received by the device 608. According to an exemplary embodiment, the encrypted access code is received via a user of the user device 604 inputting the encrypted access code (e.g., alphanumeric code, etc.) into the device interface 610. In some embodiments, upon receiving the encrypted access code, the device 608 and/or the encrypted access code implements validation and/or security protocols (e.g., installed with the security key in the device 608, programmed in the device 608, included in the encrypted access code, etc.). For example, upon receiving the encrypted access code, the device 608 may provide an incorrect password or access code warning, incorrect password or access delays, password or access lockouts, etc. Further, upon receiving the encrypted access code, the device 608 may process and store data relating an access attempt (e.g., a login attempt), for example data relating to date, time, entity identification (e.g., entity level username, username and password, etc. of the user of the user device 604), access level (e.g., access level, access level restrictions, etc. of the user of the user device 604), login status (e.g., permissible access, access denied, maximum incorrect attempts, etc.).

Process 2000 is also shown to include decrypting the encrypted access code using the security key (step 2006), according to an exemplary embodiment. In an exemplary embodiment, the device 608 decrypts the encrypted access code using the security key, and receives and/or processes decrypted access code data to determine a set of functions of the device 608 accessible to the user of the user device 604. The decrypted access code data may include, for example baseline functions of the device 608 (e.g., access level) accessible to the user, access level faults or restrictions of the device 608, function modification restrictions of the device 608, etc. In some embodiments, the decrypted access code data includes security protocols relating to the user of the user device 604 and/or the device 608. For example, device access duration, inactivity timeout duration, access level request restrictions, etc.

Process 2000 is also shown to include granting access to a predetermined set of functions of the device of building equipment based on the access code (step 2008), according to an exemplary embodiment. In exemplary embodiment, based on accessible set of functions of the device 608 obtained from the decrypted access code (e.g., at step 2006), and/or the restrictions of the user of the user device 604 obtained from the decrypted access code (e.g., at step 2006), the device 608 is configured to grant access to the user of the user device 604. The device 608, via the encrypted access code and/or the decrypted access code data, may grant the user access to a predetermined set of functions (e.g., an access level) of the device

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A system for controlling access to building equipment, the system comprising:
an access manager platform having one or more memory devices having instructions stored thereon that, when executed by one or more processors, cause the one or more processors to perform operations comprising:
receiving an access request from a user device to access a device of building equipment, the access request indicating the device of building equipment to which access is requested and an identity of an entity requesting the access;
selecting an access level of the entity from a plurality of access levels stored in an access profile database based on the identity of the entity requesting the access and the device of building equipment to which the access is requested, wherein the plurality of access levels correspond to a plurality of different predetermined sets of functions of the device of building equipment to which access can be granted;
generating an encrypted access code indicating the access level of the entity; and
transmitting the encrypted access code to the user device in response to the access request, the encrypted access code granting access to the device of building equipment and permitting the entity to access the plurality of different predetermined sets of functions of the device of building equipment corresponding to the access level when the encrypted access code is entered via a device interface of the device of building equipment; and
the device of building equipment having one or more memory devices storing a security key for the device of building equipment and instructions that, when executed by one or more processors, cause the one or more processors to perform operations comprising:
generating a device identity code identifying the device of building equipment, wherein the encrypted access code is generated based on the device identity code;
decrypting the encrypted access code using the security key to determine the access level of the entity to the device of building equipment indicated by the encrypted access code; and
granting access to a predetermined set of functions of the device of building equipment corresponding to the access level by making the predetermined set of functions accessible to the entity via the device interface.

2. The system of claim 1, the operations of the access manager platform further comprising:
determining a time period during which the encrypted access code will permit access to the device of building equipment; and
encoding an indication of the time period into the encrypted access code, wherein the encrypted access code no longer permits access to the device of building equipment after the time period has expired.

3. The system of claim 1, the operations the access manager platform further comprising:
determining a time period during which the encrypted access code will permit access to the device of building equipment; and encoding an indication of the time period into the encrypted access code, wherein the encrypted access code permits access to the device of building equipment after the time period.

4. The system of claim 1, wherein the plurality of access levels stored in the access profile database are provided by an owner of the device of building equipment.

5. The system of claim 1, wherein the encrypted access code is an alphanumeric code configured to be decrypted using the security key stored within the device of building equipment.

6. The system of claim 1, wherein the encrypted access code is provided as an input to the device of building equipment via the device interface without requiring the device of building equipment to be connected to a communications network.

7. The system of claim 1, wherein the device of building equipment is configured to present the device identity code via the device interface.

8. The system of claim 7, wherein the device identity code is presented on the device interface as a QR code.

9. The system of claim 1, wherein the device of building equipment is configured to deny access to the device of building equipment and provide an indication the entity does not have access to the device of building equipment via the device interface in response to entry of an invalid or expired access code via the device interface or in response to the encrypted access code indicating that the entity does not have access to the device of building equipment.

10. A method for controlling access to building equipment, the method comprising:

generating, by a device of building equipment, a device identity code identifying the device of building equipment;

receiving, at an access manager platform, an access request from a user device to access the device of building equipment, the access request indicating the device of building equipment to which access is requested and an identity of an entity requesting the access;

selecting, by the access manager platform, an access level of the entity from a plurality of access levels stored in an access profile database based on the identity of the entity requesting the access and the device of building equipment to which the access is requested, wherein the plurality of access levels correspond to a plurality of different predetermined sets of functions of the device of building equipment to which access can be granted;

generating, by the access manager platform, an encrypted access code indicating the access level of the entity, wherein the encrypted access code is generated based on the device identity code; transmitting, by the access manager platform, the encrypted access code to the user device in response to the access request, the encrypted access code granting access to the device of building equipment and permitting the entity to access the plurality of different predetermined sets of functions of the device of building equipment corresponding to the access level when the encrypted access code is entered via a device interface of the device of building equipment;

decrypting, by the device of building equipment, the encrypted access code using a security key stored in the device of building equipment to determine the access level of the entity to the device of building equipment indicated by the encrypted access code; and granting, by the device of building equipment, access to a predetermined set of functions of the device of building equipment corresponding to the access level by making the predetermined set of functions accessible to the entity via the device interface.

11. The method of claim 10, further comprising:

determining a time period during which the encrypted access code will permit access to the device of building equipment; and encoding an indication of the time period into the encrypted access code, wherein the encrypted access code no longer permits access to the device of building equipment after the time period has expired.

12. The method of claim 10, further comprising:

determining a time period during which the encrypted access code will permit access to the device of building equipment; and encoding an indication of the time period into the encrypted access code, wherein the encrypted access code permits access to the device of building equipment after the time period.

13. The method of claim 10, wherein the plurality of access levels stored in the access profile database are provided by an owner of the device of building equipment.

14. The method of claim 10, wherein the encrypted access code is an alphanumeric code configured to be decrypted using the security key stored within the device of building equipment.

15. The method of claim 10, wherein the encrypted access code is provided as an input to the device of building equipment via the device interface without requiring the device of building equipment to be connected to a communications network.

16. The method of claim 10, further comprising presenting the device identity code via the device interface of the device of building equipment.

17. The method of claim 16, wherein the device identity code is presented on the device interface as a QR code.

18. One or more non-transitory computer-readable media having instructions stored thereon that, when executed by one or more processors, cause the one or more processors to perform operations comprising:

generating, by a device of building equipment, a device identity code identifying the device of building equipment;

receiving, at an access manager platform, an access request from a user device to access the device of building equipment, the access request indicating the device of building equipment to which access is requested and an identity of an entity requesting the access;

selecting, by the access manager platform, an access level of the entity from a plurality of access levels stored in an access profile database based on the identity of the entity requesting the access and the device of building equipment to which the access is requested, wherein the plurality of access levels correspond to a plurality of different predetermined sets of functions of the device of building equipment to which access can be granted;

generating, by the access manager platform, an encrypted access code indicating the access level of the entity, wherein the encrypted access code is generated based on the device identity code; transmitting, by the access manager platform, the encrypted access code to the user device in response to the access request, the encrypted access code granting access to the device of building equipment and permitting the entity to access the plurality of different predetermined sets of functions of the device of building equipment corresponding to the access level when the encrypted access code is entered via a device interface of the device of building equipment;

decrypting, by the device of building equipment, the encrypted access code using a security key stored in the device of building equipment to determine the access level of the entity to the device of building equipment indicated by the encrypted access code; and granting, by the device of building equipment, access to a predetermined set of functions of the device of building equipment corresponding to the access level by making the predetermined set of functions accessible to the entity via the device interface.

19. The one or more non-transitory computer-readable media of claim 18, the operations further comprising:

determining a time period during which the encrypted access code will permit access to the device of building equipment; and encoding an indication of the time period into the encrypted access code, wherein the encrypted access code no longer permits access to the device of building equipment after the time period has expired.

20. The one or more non-transitory computer-readable media of claim 18, the operations further comprising:

determining a time period during which the encrypted access code will permit access to the device of building equipment; and encoding an indication of the time period into the encrypted access code, wherein the encrypted access code permits access to the device of building equipment after the time period.

\* \* \* \* \*